US008295218B2

(12) United States Patent
Imamura et al.

(10) Patent No.: US 8,295,218 B2
(45) Date of Patent: Oct. 23, 2012

(54) WIRELESS COMMUNICATION APPARATUS, TERMINAL, SYSTEM, PROGRAM

(75) Inventors: Koji Imamura, Osaka (JP); Hiroshi Hayashino, Hyogo (JP); Naganori Shirakata, Osaka (JP)

(73) Assignee: Panasonic Corporation, Osaka (JP)

( * ) Notice: Subject to any disclaimer, the term of this patent is extended or adjusted under 35 U.S.C. 154(b) by 491 days.

(21) Appl. No.: 12/675,588

(22) PCT Filed: Jun. 29, 2009

(86) PCT No.: PCT/JP2009/002988
§ 371 (c)(1),
(2), (4) Date: Feb. 26, 2010

(87) PCT Pub. No.: WO2010/001577
PCT Pub. Date: Jan. 7, 2010

(65) Prior Publication Data
US 2010/0260084 A1  Oct. 14, 2010

(30) Foreign Application Priority Data

Jun. 30, 2008 (JP) ................. 2008-171816

(51) Int. Cl.
*G08C 17/00* (2006.01)
*H04W 4/00* (2009.01)
*H04B 7/00* (2006.01)

(52) U.S. Cl. ........ 370/311; 370/328; 455/502; 455/517; 340/539.3

(58) Field of Classification Search ........................ None
See application file for complete search history.

(56) References Cited

U.S. PATENT DOCUMENTS

| 6,018,642 | A | 1/2000 | Adachi |
| 6,570,857 | B1 | 5/2003 | Haartsen et al. |
| 7,106,814 | B2 | 9/2006 | Carsello |
| 7,286,859 | B2 | 10/2007 | Cunningham et al. |
| 8,121,080 | B2 * | 2/2012 | Ham et al. ..................... 370/329 |
| 2005/0185628 | A1 | 8/2005 | Watanabe et al. |

(Continued)

FOREIGN PATENT DOCUMENTS

JP  9-162798  6/1997

(Continued)

OTHER PUBLICATIONS

International Search Report issued Aug. 11, 2009 in corresponding International Application No. PCT/JP2009/002988.

(Continued)

*Primary Examiner* — Clemence Han
(74) *Attorney, Agent, or Firm* — Wenderoth, Lind & Ponack, L.L.P.

(57) ABSTRACT

Provided is a compact and low power consumption wireless communication system, including a base station and communication terminals, in which power consumption of the communication terminal is reduced. The base station alternately sets an active interval during which predetermined data communication is performed, and an inactive interval during which the predetermined data communication is not performed. During the active interval, a beacon including information indicating a start timing of a subsequent active interval is transmitted and received. During the inactive interval, a sub-beacon including information providing notice of a transmission timing of a subsequent beacon is transmitted and received. When receiving the sub-beacon, the communication terminal obtains the transmission timing of the subsequent beacon and stops a supply of power to an unit related to a wireless communication function until the transmission timing.

15 Claims, 11 Drawing Sheets

U.S. PATENT DOCUMENTS

| | | | |
|---|---|---|---|
| 2006/0030362 A1* | 2/2006 | Fukuda .......................... | 455/561 |
| 2007/0187497 A1* | 8/2007 | Sukegawa et al. ............. | 235/385 |
| 2007/0188340 A1* | 8/2007 | Kimura et al. ............. | 340/691.6 |
| 2007/0253391 A1* | 11/2007 | Shao et al. .................... | 370/338 |
| 2007/0279228 A1* | 12/2007 | Morris et al. .............. | 340/572.1 |
| 2008/0123619 A1* | 5/2008 | Ko et al. ....................... | 370/345 |
| 2009/0279523 A1* | 11/2009 | Doi et al. ...................... | 370/338 |
| 2009/0290520 A1* | 11/2009 | Roberts et al. ................ | 370/311 |
| 2010/0278087 A1* | 11/2010 | Kawakami et al. ........... | 370/311 |
| 2012/0093137 A1* | 4/2012 | Sakoda et al. ................ | 370/336 |

FOREIGN PATENT DOCUMENTS

| | | |
|---|---|---|
| JP | 2004-128654 | 4/2004 |
| JP | 2005-253038 | 9/2005 |
| WO | 2008/023638 | 2/2008 |

OTHER PUBLICATIONS

Tsujoji no Time Record (Rei), [online], Oct. 18, 2005, [retrieval date Heisei 21 Nen 7 Gatsu 21 Nichi], Internet URL:http://web.archive.org/web/20051018150446/http://jjy.nict.go.jp/jjy/trans/timecodel.html.

* cited by examiner ns, or location management of a child, an elderly person or the like. Accordingly, the communication terminal is required to be compact, and, though not required to have a high performance relating to a transmission rate or in a communication distance, required to have such an ultra low power consumption that allows the communication terminal to be driven by a small battery for several years.

WIRELESS COMMUNICATION APPARATUS, TERMINAL, SYSTEM, PROGRAM

TECHNICAL FIELD

The present invention relates to a wireless communication system which attains a power-saving media access control (MAC), and more particularly to an art to reduce power consumption of a communication terminal.

BACKGROUND ART

In recent years, a compact and low power consumption wireless communication system such as WPAN (Wireless Personal Area Network) or a sensor network is attracting attention. There is a similar system which uses active RF tags that autonomously transmits wireless signals.

For example, a communication terminal used in the above-described systems has such uses as: reading a meter of gas, electricity, water or the like; outdoors monitoring of an air pollution concentration, a pollen count, a temperature or the like; a home security system like a fire-alarm box, an entrance detection sensor or the like; and location management of a child, an elderly person or the like. Accordingly, the communication terminal is required to be compact, and, though not required to have a high performance relating to a transmission rate or in a communication distance, required to have such an ultra low power consumption that allows the communication terminal to be driven by a small battery for several years.

The above-described system generally has, for example, a relatively low transmission rate of about several kbps to several hundreds kbps, and a short wireless signal transmission range of about several meters to several tens of meters. Accordingly, an output power can be smaller, so that power consumption can be kept low. However, there is a limit in allowing the above-described communication terminal to be driven by a small battery for a long period of time only by designing the transmission rate to be low and the transmission range to be short as described above. Alternatively, various arts to reduce power consumption are suggested for further downsizing and further lengthening of operating life.

As a conventional art to reduce a power consumption of the above-described communication terminal, an art is disclosed, for example, in which a period of time for transmitting and receiving data in a low traffic network such as a sensor network and the like is preliminarily specified, and a supply of power to a unit related to a wireless communication function is stopped except for at the above-described period of time (see Patent Literature 1 and the "IEEE 802.15.4" standard). In such a conventional art, in order to adjust the period of time for transmitting and receiving data between apparatuses, a synchronous mode referred to as a beacon mode is used.

FIG. 14 is a diagram illustrating an outline of the beacon mode in the wireless communication system described in Patent Literature 1.

In FIG. 14, time advances from left to right, and an active interval and an inactive interval are set to be alternately repeated. A base station transmits a wireless packet referred to as a beacon at the beginning of the active interval which has been set by the base station, and thereafter, transmits and receives data only in the active interval but not in the inactive interval which has been set by the base station. Here, the beacon is a wireless packet in which synchronization information necessary for synchronizing the respective apparatuses is written in a data field, and the synchronization information is, for example, information indicating a beacon time period T_b until subsequent beacons are to be transmitted.

When receiving a beacon transmitted from the base station, the communication terminal recognizes that there is an active interval with the beacon at the beginning. Further, after performing necessary transmission and reception during the active interval, the communication terminal recognizes a transmission timing of the subsequent beacon and a subsequent inactive interval based on information included in the received beacon and indicating the beacon time period $T\_b$, thereby stopping a supply of power to the units relating to the wireless communication function.

Citation List

[Patent Literature]

[PTL 1] (PCT) International Publication WO2008/023638

SUMMARY OF INVENTION

Technical Problem

However, since it is not clear when the subsequent beacon is transmitted in the above-described conventional reduction method, in the case where the communication terminal does not acknowledge the transmission timing of the subsequent beacon, that is, when the communication terminal initially joins a system, or immediately after failing in reception of the beacon due to a trouble in a reception condition or the like. Subsequently, a supply of power to the units relating to the wireless communication function cannot be stopped during the inactive interval, whereby a wireless reception function is necessarily kept in order to receive the beacon. For example, in a system where an active interval of ten minutes is executed three times a day at eight-hour intervals, in order to keep the wireless reception function, power is wasted over time by up to 48 times (60 min/10 min×8 hrs) in one active interval. This corresponds to 16 days of a successful and usual operation case by simple arithmetic. Further, in a system for reading a meter of public utility charges, for example, the active interval is sufficient at once every month or two months, whereby, assuming that one active interval is likewise set to ten minutes, in the case of one active interval every month, in order to keep the wireless reception function, power is wasted over time by up to 4464 times (60 min/10 min×24 hrs×31 days; in the case of every two months, almost twice as much as the case of one month) in one active interval. This corresponds to 32 years (in the case of every two months, almost four times as much as the case of one month, that is, 128 years) of a successful and usual operation case. Accordingly, when some measures are not taken, power is significantly wasted, whereby a battery life is greatly reduced and downsizing is interfered with.

Therefore, an object of the present invention is to reduce power consumption of a communication terminal in a compact and low-power consumption wireless communication system, and particularly to provide a wireless communication apparatus, a communication terminal, a wireless communication system, a wireless communication apparatus program, a communication terminal program, an integrated circuit used in the wireless communication apparatus, an integrated circuit used in the communication terminal, and a wireless communication method in which even when the beacon mode is used and the communication terminal does not acknowledge a transmission timing of the subsequent beacon, power is not significantly wasted, whereby a battery life is not greatly reduced.

Solution to Problem

The present invention is directed to a wireless communication apparatus. In order to solve the above-mentioned problems, the wireless communication apparatus of the present invention is a wireless communication apparatus which performs, with a communication terminal, predetermined data communication during an active interval, and does not perform the predetermined data communication during an inactive interval, the wireless communication apparatus including: an interval set section that alternately sets the active interval and the inactive interval; a base station communication section that performs the predetermined data communication with the communication terminal as well as transmitting a beacon to the communication terminal during the active interval which is set by the interval set section, the beacon including information indicating a start timing of a subsequent active interval which is set by the interval set section; and a sub-beacon transmission section that transmits a sub-beacon to the communication terminal during the inactive interval, the sub-beacon including information providing notice of a transmission timing of a subsequent beacon which is to be transmitted by the base station communication section.

Preferably, the sub-beacon transmission section transmits the sub-beacon multiple times during the inactive interval, and the sub-beacon transmitted each time includes information indicating an amount of time from a transmission timing at which the own sub-beacon is transmitted until the transmission timing of the subsequent beacon.

Preferably, the sub-beacon includes time information having a plurality of digits as information indicating an amount of time until the transmission timing of the subsequent beacon, and the sub-beacon transmission section transmits a more significant digit of the time information later than a less significant digit thereof.

Preferably, the sub-beacon transmission section transmits the sub-beacon to the communication terminal during the active interval as well as the inactive interval.

The present invention is directed to a communication terminal. In order to solve the above-mentioned problems, the communication terminal of the present invention is a communication terminal which performs, with a base station alternately setting an active interval and an inactive interval, predetermined data communication during the active interval, and does not perform the predetermined data communication during the inactive interval, the communication terminal including: a terminal communication section that performs the predetermined data communication with the base station as well as receiving, from the base station, during the active interval, a beacon including information indicating a start timing of a subsequent active interval so as to obtain the start timing of the subsequent active interval; a sub-beacon reception section that receives from the base station, when the start timing of the subsequent active interval is not obtained by the terminal communication section, a sub-beacon which provides notice of a transmission timing of a subsequent beacon so as to obtain the transmission timing at which the subsequent beacon is transmitted; and a power supply control section that stops, when the start timing of the subsequent active interval is obtained by the terminal communication section, a supply of power to units related to a wireless communication function, the units including the terminal communication section and the sub-beacon reception section, after the end of the predetermined data communication until the start timing, and stops, when the transmission timing at which the subsequent beacon is transmitted is obtained by the sub-beacon reception section, the supply of power to the units related to the wireless communication function until the transmission timing.

Preferably, wherein the sub-beacon is transmitted multiple times from the base station during the inactive interval, and the sub-beacon transmitted each time includes information indicating an amount of time from a transmission timing at which the own sub-beacon is transmitted until the transmission timing of the subsequent beacon, the sub-beacon reception section, when receiving the sub-beacon, obtains from the sub-beacon the amount of time until the transmission timing of the subsequent beacon, and the power supply control section stops the supply of power to the units related to the wireless communication function until the transmission timing of the subsequent beacon, the transmission timing being obtained by the sub-beacon reception section.

Preferably, the sub-beacon includes time information having a plurality of digits as information providing notice of the transmission timing of the subsequent beacon, and a more significant digit of the time information is transmitted later than a less significant digit thereof, and wherein when the sub-beacon reception section receives the sub-beacon so as to obtain the time information from the sub-beacon, and in the case where cancellation of significant digits occurs at the less significant digit portion of the time information but the more significant digit portion of the time information is successfully received, the sub-beacon reception section replaces the less significant digit portion at which the cancellation of significant digits occurs with a predetermined value so as to set an earliest timing among possible transmission timings of the subsequent beacon to be the transmission timing of the subsequent beacon.

Preferably, the terminal communication section further transmits the sub-beacon when performing the predetermined data communication during the active interval; and the sub-beacon reception section further receives from another communication terminal, when the terminal communication section does not obtain the start timing of the subsequent active interval, a sub-beacon providing notice of the transmission timing of the subsequent beacon so as to obtain the transmission timing at which the subsequent beacon is transmitted.

The present invention is directed to a wireless communication system. In order to solve the above-mentioned problems, the wireless communication system of the present invention is a wireless communication system including a base station and a communication terminal, which performs, between the base station and the communication terminal, predetermined data communication during an active interval, and does not perform the predetermined data communication during an inactive interval, wherein the base station includes: an interval set section that alternately sets the active interval and the inactive interval; a base station communication section that performs the predetermined data communication with the communication terminal as well as transmitting a beacon to the communication terminal during the active interval which is set by the interval set section, the beacon including information indicating a start timing of a subsequent active interval which is set by the interval set section; and a sub-beacon transmission section that transmits a sub-beacon to the communication terminal during the inactive interval, the sub-beacon including information providing notice of a transmission timing of a subsequent beacon which is to be transmitted by the base station communication section, and the communication terminal includes: a terminal communication section that performs the predetermined data communication with the base station as well as receiving the beacon from the base station during the active interval so as to obtain the start timing of the subsequent active interval; a sub-beacon reception section that receives the sub-beacon from the base station when the start timing of the subsequent active interval is not obtained by the terminal communication section, so as to obtain the transmission timing at which the subsequent beacon is transmitted; and a power supply control section that stops, when the start timing of the subsequent active interval is obtained by the terminal communication section, a supply of power to units related to a wireless communication function, the units including the terminal communication section and the sub-beacon reception section, after the end of the predetermined data communication until the start timing, and stops, when the transmission timing at which the subsequent beacon is transmitted is obtained by the sub-beacon reception section, the supply of power to the units related to the wireless communication function until the transmission timing.

The present invention is directed to a program for a wireless communication apparatus. In order to solve the above-mentioned problems, the program for the wireless communication apparatus of the present invention is a wireless communication program to be executed by a wireless communication apparatus which performs, with a communication terminal, predetermined data communication during an active interval, and does not perform the predetermined data communication during an inactive interval, the program causing the wireless communication apparatus to execute: an interval set step of alternately setting the active interval and the inactive interval; a base station communication step of performing the predetermined data communication with the communication terminal as well as transmitting a beacon to the communication terminal during the active interval which is set in the interval set step, the beacon including information indicating a start timing of a subsequent active interval which is set in the interval set step; and a sub-beacon transmission step of transmitting a sub-beacon to the communication terminal during the inactive interval, the sub-beacon including information providing notice of a transmission timing of a subsequent beacon which is to be transmitted in the base station communication step.

The present invention is directed to a program for a communication terminal. In order to solve the above-mentioned problems, the program for the communication terminal of the present invention is a communication terminal program to be executed by a communication terminal which performs, with a base station alternately setting an active interval and an inactive interval, predetermined data communication during the active interval, and does not perform the predetermined data communication during the inactive interval, the program causing the communication terminal to execute: a terminal communication step of performing the predetermined data communication with the base station and receiving, from the base station, during the active interval, a beacon including information indicating a start timing of a subsequent active interval so as to obtain the start timing of the subsequent active interval; a sub-beacon reception step of receiving from the base station, when the start timing of the subsequent active interval is not obtained in the terminal communication step, a sub-beacon which provides notice of a transmission timing of a subsequent beacon so as to obtain the transmission timing at which the subsequent beacon is transmitted; and a power supply control step of stopping, when the start timing of the subsequent active interval is obtained in the terminal communication step, a supply of power to an unit related to a wireless communication function, after the end of the predetermined data communication until the start timing, and stopping, when the transmission timing at which the subsequent beacon is transmitted is obtained in the sub-beacon reception step, the supply of power to the unit related to the wireless communication function until the transmission timing.

The present invention is directed to an integrated circuit used for a wireless communication apparatus. In order to solve the above-mentioned problems, the integrated circuit used for the wireless communication apparatus of the present invention is an integrated circuit to be used in a wireless communication apparatus which performs, with a communication terminal, predetermined data communication during an active interval, and does not perform the predetermined data communication during an inactive interval, the integrated circuit integrating circuits which act as: an interval set section that alternately sets the active interval and the inactive interval; a base station communication section that performs the predetermined data communication with the communication terminal as well as transmitting a beacon to the communication terminal during the active interval which is set by the interval set section, the beacon including information indicating a start timing of a subsequent active interval which is set by the interval set section; and a sub-beacon transmission section that transmits a sub-beacon to the communication terminal during the inactive interval, the sub-beacon including information providing notice of a transmission timing of a subsequent beacon which is to be transmitted by the base station communication section.

The present invention is directed to an integrated circuit used for a communication terminal. In order to solve the above-mentioned problems, the integrated circuit used for the communication terminal of the present invention is an integrated circuit to be used in a communication terminal which performs, with a base station alternately setting an active interval and an inactive interval, predetermined data communication during the active interval, and does not perform the predetermined data communication during the inactive interval, the integrated circuit integrating circuits which act as: a terminal communication section that performs the predetermined data communication with the base station during the active interval, and receives, from the base station, a beacon including information indicating a start timing of a subsequent active interval so as to obtain the start timing of the subsequent active interval; a sub-beacon reception section that receives from the base station, when the start timing of the subsequent active interval is not obtained by the terminal communication section, a sub-beacon which provides notice of a transmission timing of a subsequent beacon so as to obtain the transmission timing at which the subsequent beacon is transmitted; and a power supply control section that stops, when the start timing of the subsequent active interval is obtained by the terminal communication section, a supply of power to units related to a wireless communication function, the units including the terminal communication section and the sub-beacon reception section, after the end of the predetermined data communication until the start timing, and stops, when the transmission timing at which the subsequent beacon is transmitted is obtained by the sub-beacon reception section, the supply of power to the units related to the wireless communication function until the transmission timing.

The present invention is directed to a wireless communication method. In order to solve the above-mentioned problems, the wireless communication method of the present invention is a wireless communication method in a wireless communication apparatus which performs, with a communication terminal, predetermined data communication during an active interval, and does not perform the predetermined data communication during an inactive interval, the wireless communication method including: an interval set step of alternately setting the active interval and the inactive interval; a base station communication step of performing the predetermined data communication with the communication terminal as well as transmitting a beacon to the communication terminal during the active interval which is set in the interval set step, the beacon including information indicating a start timing of a subsequent active interval which is set in the interval set step; step of transmitting a sub-beacon to the communication terminal during the inactive interval, the sub-beacon including information providing notice of a transmission timing of a subsequent beacon which is to be transmitted in the base station communication step.

The present invention is directed to a wireless communication method. In order to solve the above-mentioned problems, the wireless communication method of the present invention is a wireless communication method in a communication terminal which performs, with a base station alternately setting an active interval and an inactive interval, predetermined data communication during the active interval, and does not perform the predetermined data communication during the inactive interval, the wireless communication method including: a terminal communication step of performing the predetermined data communication with the base station and receiving, from the base station, during the active interval, a beacon including information indicating a start timing of a subsequent active interval so as to obtain the start timing of the subsequent active interval; a sub-beacon reception step of receiving from the base station, when the start timing of the subsequent active interval is not obtained in the terminal communication step, a sub-beacon which provides notice of a transmission timing of a subsequent beacon so as to obtain the transmission timing at which the subsequent beacon is transmitted; and a power supply control step of stopping, when the start timing of the subsequent active interval is obtained in the terminal communication step, a supply of power to an unit related to a wireless communication function, after the end of the predetermined data communication until the start timing, and stopping, when the transmission timing at which the subsequent beacon is transmitted is obtained in the sub-beacon reception step, the supply of power to the unit related to the wireless communication function until the transmission timing.

The present invention is directed to a wireless communication method. In order to solve the above-mentioned problems, the wireless communication method of the present invention is a wireless communication method in a wireless communication system including a base station and a communication terminal, which performs, between the base station and the communication terminal, predetermined data communication during an active interval, and does not perform the predetermined data communication during an inactive interval, the wireless communication method including: an interval set step of alternately setting, by the base station, the active interval and the inactive interval; a base station communication step of performing, by the base station, the predetermined data communication with the communication terminal as well as transmitting a beacon to the communication terminal during the active interval which is set in the interval set step, the beacon including information indicating a start timing of a subsequent active interval which is set in the interval set step; a sub-beacon transmission step of transmitting, by the base station, a sub-beacon to the communication terminal during the inactive interval, the sub-beacon including information providing notice of a transmission timing of a subsequent beacon which is to be transmitted in the base station communication step; a terminal communication step of performing, by the communication terminal, the predetermined data communication with the base station and receiving, by the communication terminal, during the active interval, the beacon from the base station so as to obtain the start timing of the subsequent active interval; a sub-beacon reception step of receiving, by the communication terminal, the sub-beacon from the base station when the start timing of the subsequent active interval is not obtained in the terminal communication step, so as to obtain the transmission timing at which the subsequent beacon is transmitted; and a power supply control step of stopping by the communication terminal, when the start timing of the subsequent active interval is obtained in the terminal communication step, a supply of power to an unit related to a wireless communication function, after the end of the predetermined data communication until the start timing, and stopping by the communication terminal, when the transmission timing at which the subsequent beacon is transmitted is obtained in the sub-beacon reception step, the supply of power to the unit related to the wireless communication function until the transmission timing.

ADVANTAGEOUS EFFECTS OF INVENTION

As described above, according to the present invention, a base station is capable of promptly turning a communication terminal, which does not synchronize with a beacon time period, to be set in a sleep state by transmitting, during an inactive interval, a sub-beacon indicating a transmission timing of the subsequent beacon. Consequently, wasteful power consumption in the communication terminal is minimized and power consumption is reduced.

BRIEF DESCRIPTION OF DRAWINGS

FIG. 6 is a diagram illustrating a reception condition in the case where data is defective due to a wireless wave interference, signal deterioration or the like.

DESCRIPTION OF EMBODIMENTS

[First Embodimen]

<Outline>

A feature of the present embodiment is that when a beacon mode is used in a compact and low-power consumption wireless communication system, a base station transmits, during an inactive interval, a sub-beacon providing notice of a transmission timing of a subsequent beacon and when a communication terminal does not acknowledge a start timing of a subsequent active interval and receives the sub-beacon during the inactive interval, a supply of power to a unit relating to a wireless communication function is stopped until the transmission timing of the subsequent beacon.

<Structure>

Figure 1:
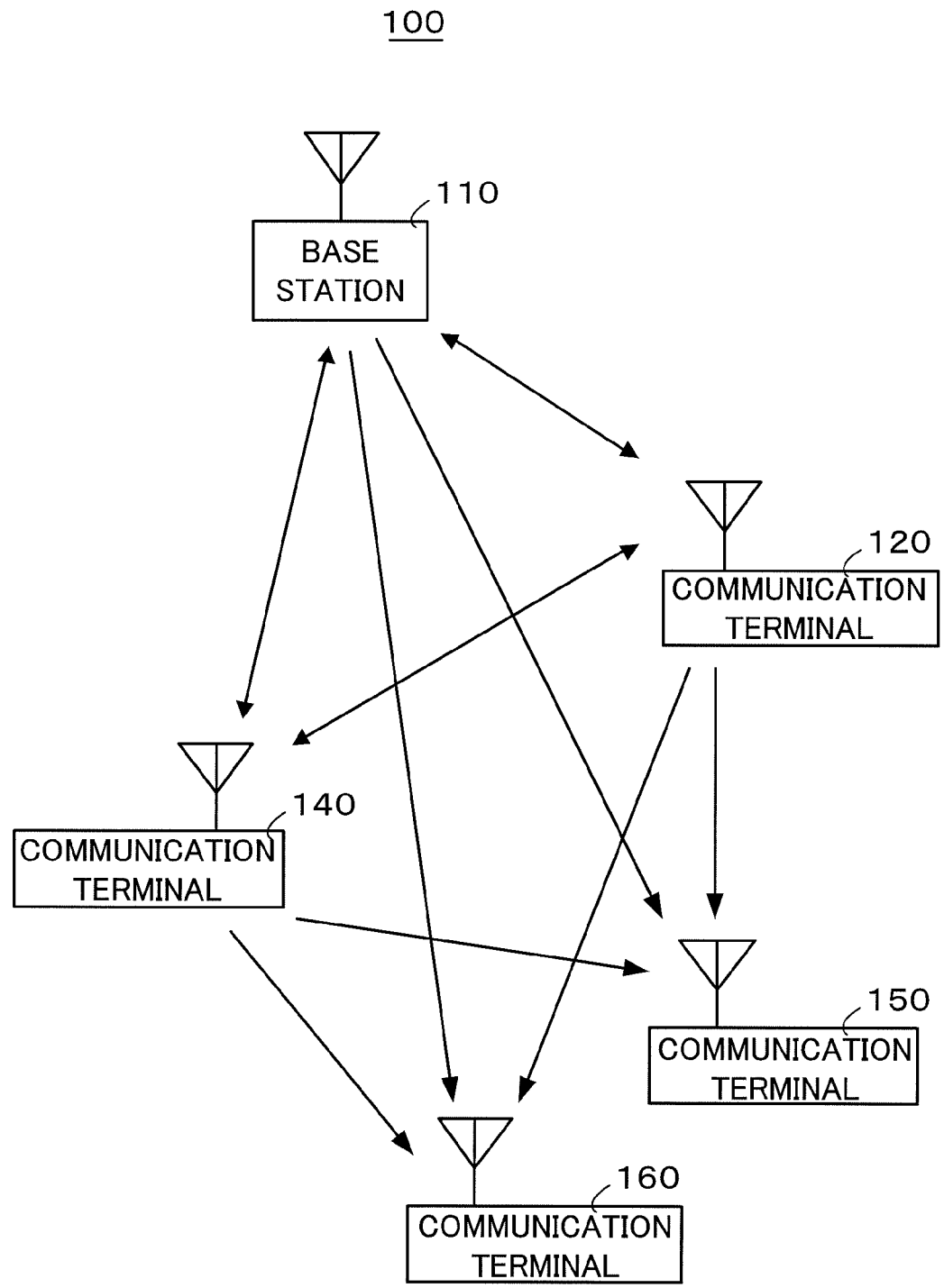
FIG. 1 is a diagram illustrating an outline of a wireless communication system 100 according to a first embodiment.

FIG. 1 is a diagram illustrating an outline of a wireless communication system 100 according to a first embodiment.

As illustrated in FIG. 1, the wireless communication system 100 includes a base station 110, and communication terminals 120, 140, 150, and 160.

Here, the wireless communication system 100 is designed to alternately produce an active interval during which usual and predetermined data communication is performed, and an inactive interval during which data communication is not performed, basically, and a supply of power to units relating to a wireless communication function is stopped.

The base station 110 is a wireless communication apparatus having multiple functions in comparison with the communication terminal and performs data communication with the communication terminals 120, 140, 150, and 160.

In the present specification, components of wireless communication systems according to the respective embodiments are represented as the base station and the communication terminal, but the wireless communication system can be constructed by using, as the base station, a personal computer having the wireless communication function, and, as the communication terminal, an active RF tag having a sensor attached or embedded. However, the structure is not limited to that described above, and any devices which can construct such relation as between a main phone and a cordless handset or between a master and a slave can be used.

Since the base station performs communication control on the communication terminal, it is preferable to supply the base station with power by using, for example, a commercial power source, a chargeable battery, a solar battery or the like, which has an excess supply capacity in comparison with the communication terminal.

The communication terminals 120, 140, 150, and 160 are communication terminals which are highly portable wireless communication terminals used, for example, in combination with variable measuring instruments, sensors, or the like, to transmit measured data. The communication terminals 120, 140, 150, and 160 are compact in principle, driven by a small battery, and perform data communication with the base station 110 or among communication terminals which are mutually synchronized. In the present embodiment, it is assumed that the communication terminals 120 and 140 are synchronized with the base station 110, and the communication terminals 150 and 160 are not synchronized with the base station 110.

In order to mutually synchronize the respective components, the base station 110 transmits, to the communication terminals 120, 140, 150, and 160, a beacon including detailed information related to communication performed during the subsequent active interval such as a start timing of a subsequent active interval, and conditions, protocol, and the like of the data communication.

Figure 2:
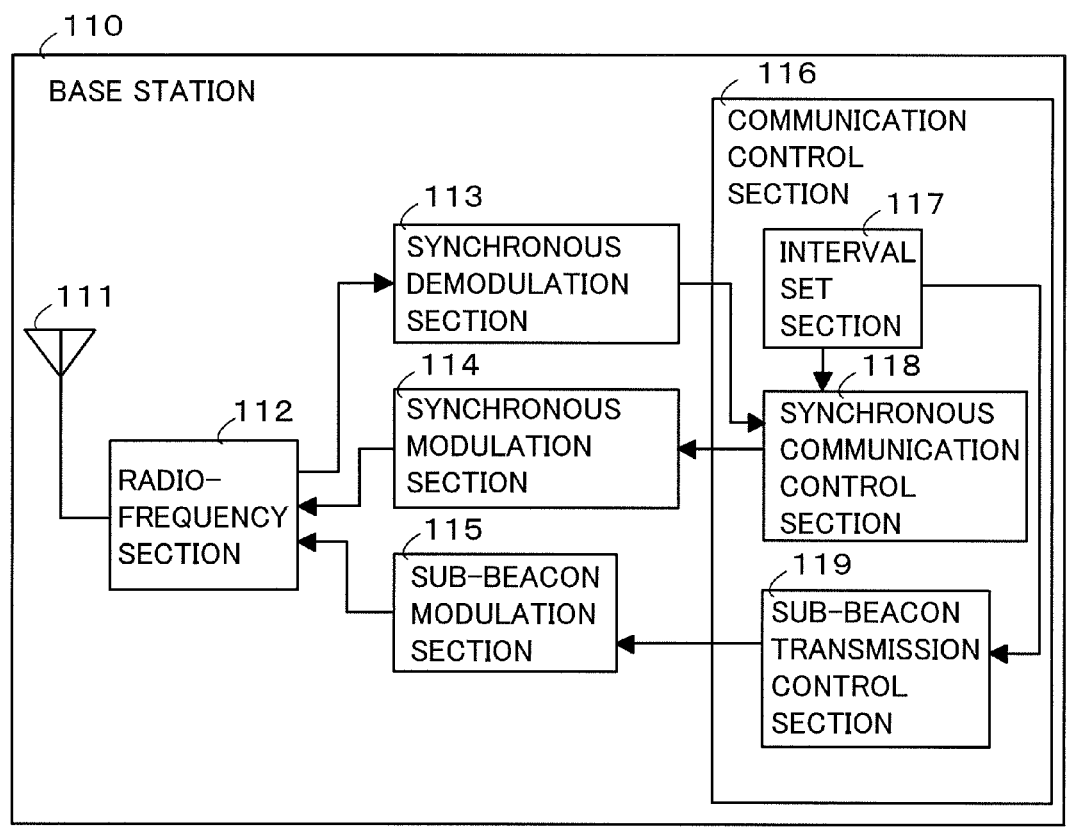
FIG. 2 is a diagram illustrating an outline of a base station 110.

FIG. 2 is a diagram illustrating an outline of the base station 110.

As illustrated in FIG. 2, the base station 110 includes an antenna 111, a radio-frequency section 112, a synchronous demodulation section 113, a synchronous modulation section 114, a sub-beacon modulation section 115, and a communication control section 116. The communication control section 116 includes an interval set section 117, a synchronous communication control section 118, and a sub-beacon transmission control section 119.

The antenna 111 is used when the data, the beacon, and the sub-beacon are transmitted to or received from the respective communication terminals.

When receiving wireless signals by using the antenna 111, the radio-frequency section 112 performs frequency conversion from a predetermined radio frequency to a baseband frequency to generate baseband signals, and outputs the baseband signals to the synchronous demodulation section 113.

The synchronous demodulation section 113 demodulates the baseband signals outputted by the radio-frequency section 112, and outputs the demodulated signals to the communication control section 116.

The communication control section 116 obtains the demodulated signals from the synchronous demodulation section 113, and outputs a data portion of the demodulated signals to an upper layer.

The interval set section 117 in the communication control section 116 alternately sets, based on user's selection or preliminarily determined rules, an active interval and an inactive interval, and decides a start timing of the subsequent active interval. Further, the interval set section 117 decides the respective transmission timings of sub-beacons to be transmitted by the subsequent active interval, and sets, principally during an inactive interval, transmission timings of the sub-beacons to be transmitted by the subsequent active interval.

The synchronous communication control section 118 in the communication control section 116 obtains transmission control information and transmission data (including a beacon) from the upper layer, and outputs the transmission data, a data modulation request, and modulation parameters to the synchronous modulation section 114 during an active interval which is set by the interval set section 117, thereby causing the base station 110 to perform data communication, and transmission of the beacon with the communication terminals 120, 140, 150, and 160.

The sub-beacon transmission control section 119 in the communication control section 116 outputs, principally in the inactive interval set by the interval set section 117, a sub-beacon modulation request and beacon time information to the sub-beacon modulation section 115 so as to control the base station 110 to perform transmission of the sub-beacon at the sub-beacon transmission timing which is set by the interval set section 117.

The synchronous modulation section 114 obtains the transmission data, the data modulation request, and the modulation parameters from the synchronous communication control section 118 in the communication control section 116, performs modulation on the obtained transmission data, in accordance with the obtained data modulation request and based on the obtained modulation parameters, and outputs transmission data signals to the radio-frequency section 112.

The sub-beacon modulation section 115 obtains the sub-beacon modulation request and the beacon time information from the sub-beacon transmission control section 119 in the communication control section 116, performs modulation on the obtained beacon time information, in accordance with the obtained sub-beacon modulation request, so as to generate sub-beacon signals, and outputs the sub-beacon signals to the radio-frequency section 112. Here, since the sub-beacon modulation section 115 uses a modulation method simpler than that used by the synchronous modulation section 114, necessary power for sub-beacon demodulation which is performed in the communication terminals 120, 140, 150, and 160 is reduced.

When obtaining the transmission data signals from the synchronous modulation section 114, or obtaining the sub-beacon signals from the sub-beacon modulation section 115, the radio-frequency section 112 performs predetermined frequency conversion on the transmission data signals (including beacon signals) or the sub-beacon signals so as to perform frequency conversion from the baseband frequency to the radio frequency to generate radio frequency signals, and transmits the radio frequency signals by using the antenna 111.

Figure 3:
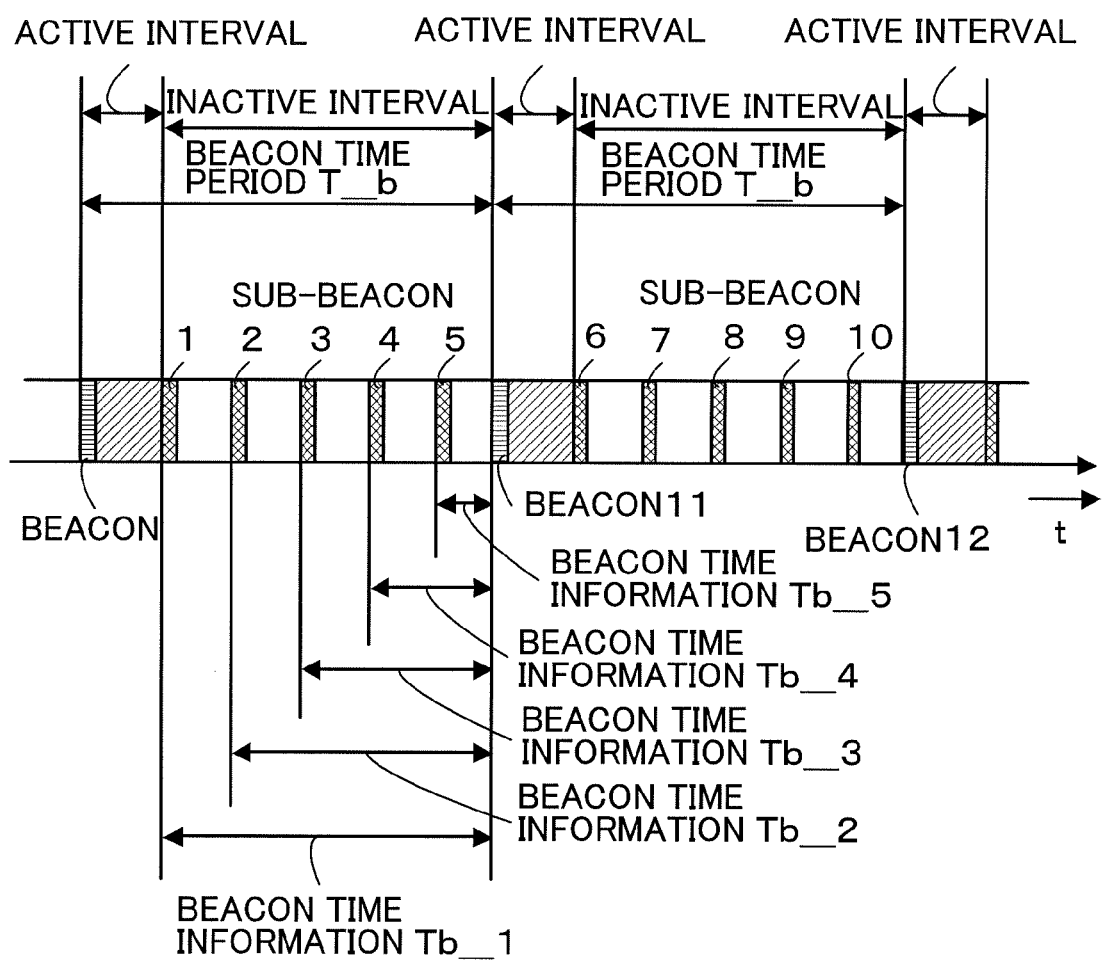
FIG. 3 is a diagram illustrating an outline of a beacon mode in the wireless communication system of the present embodiment.

FIG. 3 is a diagram illustrating an outline of the beacon mode in the wireless communication system of the present embodiment.

Figure 14:
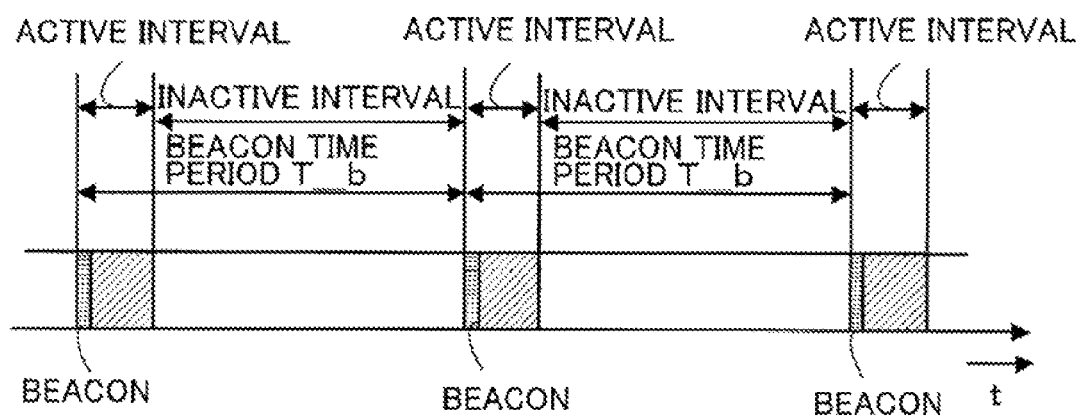
FIG. 14 is a diagram illustrating an outline of a beacon mode in a conventional wireless communication system described in Patent Literature 1.

In FIG. 3, time advances from left to right, and the active interval and the inactive interval are set to be alternately repeated. In comparison with the outline of the conventional beacon mode illustrated in FIG. 14, FIG. 3 is different in that the sub-beacon is transmitted multiple times at regular intervals or at odd intervals during the inactive interval.

In FIG. 3, sub-beacons 1-5 each include information indicating a transmission timing of the beacon 11 to be subsequently transmitted. Similarly, sub-beacons 6-10 each include information indicating a transmission timing of a beacon 12 to be subsequently transmitted. The respective sub-beacons 1-5 are, for example, pieces of information each indicating an amount of time from a transmission timing at which an own sub-beacon is transmitted until the transmission timing of the subsequent beacon 11. Specifically, the sub-beacon 1 includes the beacon time information Tb_1 indicating the amount of time from a transmission start of the own sub-beacon until a transmission start of the beacon 11, which is illustrated in FIG. 3. In the same way, the sub-beacon 2 includes the beacon time information Tb_2 indicating the amount of time from a transmission start of the own sub-beacon until the transmission start of the beacon 11, which is illustrated in FIG. 3. The sub-beacon 3 includes the beacon time information Tb_3 indicating the amount of time from a transmission start of the own sub-beacon until the transmission start of the beacon 11, which is illustrated in FIG. 3. The sub-beacon 4 includes the beacon time information Tb_4 indicating the amount of time from a transmission start of the own sub-beacon until the transmission start of the beacon 11, which is illustrated in FIG. 3. The sub-beacon 5 includes the beacon time information Tb_5 indicating the amount of time from a transmission start of the own sub-beacon until the transmission start of the beacon 11, which is illustrated in FIG. 3.

Alternatively, when the respective components in the wireless communication system are commonly adjusted to absolute time, the transmission timing of the beacon 11 may be, for example, time information indicating the transmission start time of the beacon 11.

Further alternatively, transmission intervals of the sub-beacons may be either regular or irregular. For example, the transmission intervals of the sub-beacons may be set shortest immediately after the beginning of the inactive interval, and longer with approaching the end of the inactive interval.

Still alternatively, the transmission timing of the beacon may not necessarily be set at the beginning of the active interval so long as the transmission timing is set during the active interval.

Still alternatively, the beacon time periods T_b each specifying the amount of time until the subsequent active interval, though not necessarily be frequently altered, may be the same every time or may be altered. For example, when the active interval is set to the same time every day, the beacon time period T_b is the same every time, but when the active interval is set to the same time and the same day each month, since the number of days varies each month, the beacon time period T_b is frequently altered. Here, when recognizing that the beacon time period T_b is the same every time, the respective communication terminals are capable of obtaining the amount of time until the subsequent active interval or the transmission timing of the subsequent beacon even immediately after failing in reception of the beacon. However, not only information indicating the beacon time period T_b is written in the beacon, but, in practice, alteration information is included, and/or various conditions, rules, and the like for performing communication during the current active interval are written. Accordingly, regardless of whether or not the beacon time period T_b is the same every time, it is essential to follow information in the latest received beacon.

Figure 4:
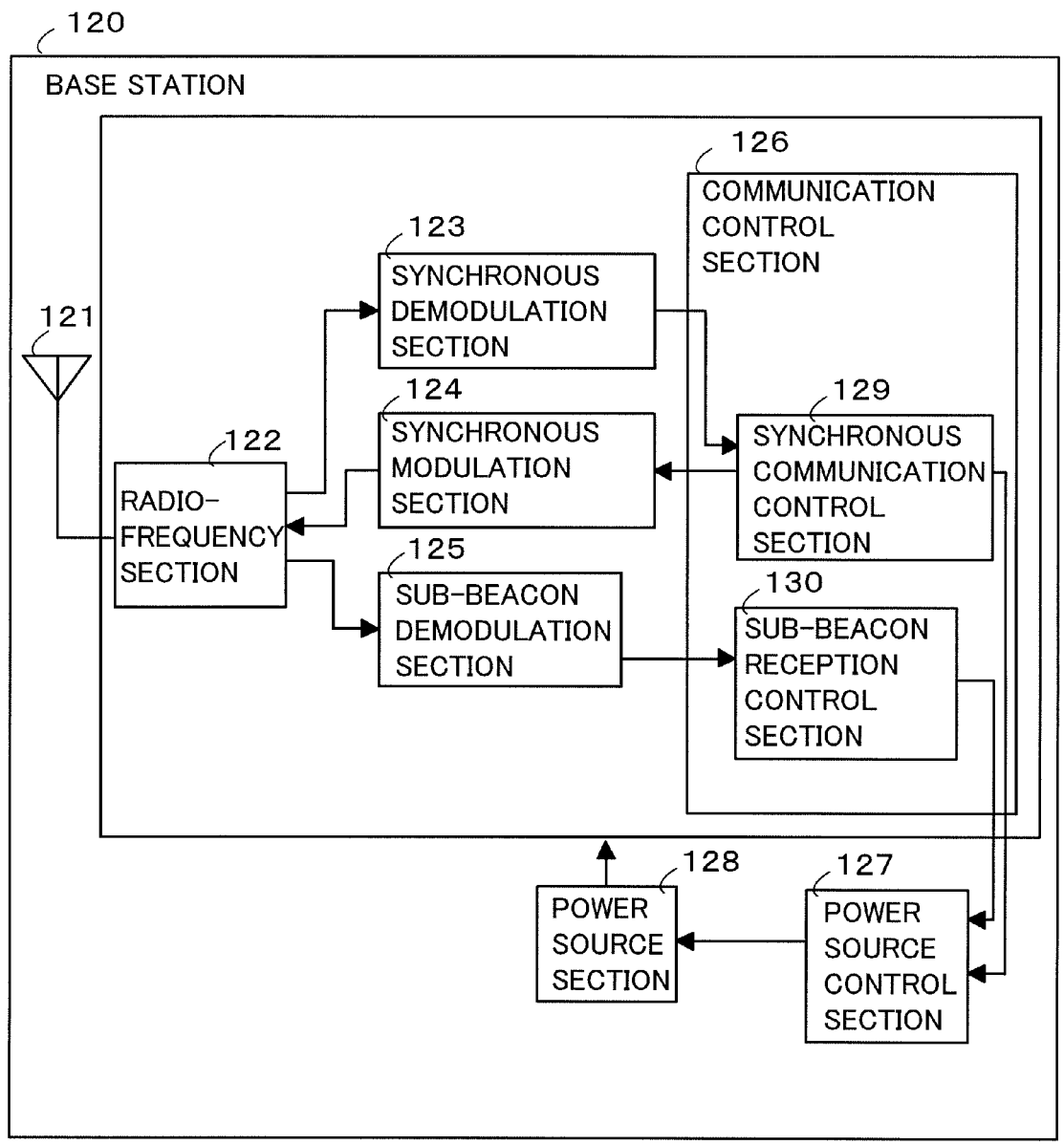
FIG. 4 is a diagram illustrating an outline of a communication terminal 120.

FIG. 4 is a diagram illustrating an outline of the communication terminals 120.

As illustrated in FIG. 4, the communication terminals 120 includes an antenna 121, a radio-frequency section 122, a synchronous demodulation section 123, a synchronous modulation section 124, a sub-beacon demodulation section 125, a communication control section 126, a power source control section 127, and a power source section 128. The communication control section 126 includes a synchronous communication control section 129 and a sub-beacon reception control section 130.

Here, the communication terminals 140, 150, and 160 each have the same configuration as that of the communication terminals 120, and detailed description is omitted.

The antenna 121 is used when the data, the beacon, and the sub-beacon are transmitted to or received from the respective communication terminals.

When receiving wireless signals by using the antenna 121, the radio-frequency section 122 performs frequency conversion from a predetermined radio frequency to a baseband frequency to generate baseband signals, and outputs the baseband signals to the synchronous demodulation section 123 and the sub-beacon demodulation section 125.

The synchronous demodulation section 123 demodulates the baseband signals outputted by the radio-frequency section 122, and when demodulated signals of the transmission data signals (including beacon signals) are obtained, outputs the demodulated signals of the transmission data signals to the synchronous communication control section 129 in the communication control section 126.

The sub-beacon demodulation section 125 demodulates the baseband signals outputted by the radio-frequency section 122, and when demodulated signals of the sub-beacon signals are obtained, outputs the demodulated signals of the sub-beacon signals to the sub-beacon reception control section 130 in the communication control section 126.

The synchronous communication control section 129 in the communication control section 126 obtains the demodulated signals of the transmission data signals from the synchronous demodulation section 123, and outputs a data portion of the demodulated signals of the transmission data signals to the upper layer. Further, when the demodulated signals are the beacon signals, the synchronous communication control section 129 extracts synchronization information which is included in the data portion and necessary for synchronizing with the base station 110 so as to obtain the start timing of the subsequent active interval based on the synchronization information, and outputs the start timing of the subsequent active interval to the power source control section 127. Here, the synchronization information is information indicating the beacon time period T_b illustrated in FIG. 3, and indicating the amount of time until the subsequent active interval as well as the transmission timing of the subsequent beacon.

The sub-beacon reception control section 130 in the communication control section 126 obtains the demodulated signals of the sub-beacon signals from the sub-beacon demodulation section 125, extracts sub-beacon information included in the data portion of the demodulated signals of the sub-beacon signals, obtains the transmission timing of the subsequent beacon based on the sub-beacon information, and outputs the transmission timing of the subsequent active interval to the power source control section 127. Here, the sub-beacon information corresponds to pieces of the beacon time information Tb_1~Tb_5 or the like illustrated in FIG. 3, each indicating the transmission timing of the subsequent beacon.

When obtaining the start timing of the subsequent active interval from the synchronous communication control section 129, the power source control section 127 recognizes after the data communication that the inactive interval spans until the start timing, thereby instructing the power source section 128 to stop a supply of power to the units related to the wireless communication function. Further, the power source control section 127 recognizes that an active interval starts from the start timing, thereby instructing the power source section 128 to restart a supply of power. Further, when obtaining, from the sub-beacon reception control section 130, the transmission timing at which the subsequent beacon is to be transmitted, the power source control section 127 instructs the power source section 128 to stop, until the transmission timing, a supply of power to the units such as the radio-frequency section 122, the synchronous demodulation section 123, the synchronous modulation section 124, the sub-beacon demodulation section 125, the communication control section 126, and the like, which are related to the wireless communication function.

In the present embodiment, the units related to the wireless communication function are the radio-frequency section 122, the synchronous demodulation section 123, the synchronous modulation section 124, the sub-beacon demodulation section 125, and the communication control section 126 illustrated in FIG. 4.

The power source section 128 supplies power to the respective components, and stops or restarts a supply of power to the units related to the wireless communication function in accordance with an instruction outputted by the power source control section 127.

The synchronous modulation section 124 obtains transmission data, a data modulation request, and modulation parameters from the synchronous communication control section 129 in the communication control section 126, modulates the obtained transmission data in accordance with the obtained data modulation request and based on the obtained modulation parameters, and outputs the transmission data signals to the radio-frequency section 122.

When obtaining the transmission data signals from the synchronous modulation section 124, the radio-frequency section 122 performs predetermined conversion on the transmission data signals so as to perform frequency conversion from the baseband frequency to the radio frequency to generate radio frequency signals, and transmits the radio frequency signals by using the antenna 121.

In the present embodiment, the communication terminal 120 stops a supply of power to the units related to the wireless communication function during the inactive interval, whereby power consumption is reduced. Alternatively, when the sub-beacons are not transmitted during the inactive interval, the base station 110 may stop a supply of power to units including the radio-frequency section 112, the synchronous demodulation section 113, the synchronous modulation section 114, and the sub-beacon modulation section 115, which are related to the wireless communication function, and when the sub-beacons are transmitted during the inactive interval, the base station 110 may stop a supply of power to units such as the synchronous demodulation section 113 and the synchronous modulation section 114, which are units other than units related to a sub-beacon transmission function among the units related to the wireless communication function, whereby power consumption is reduced.

Figure 5:
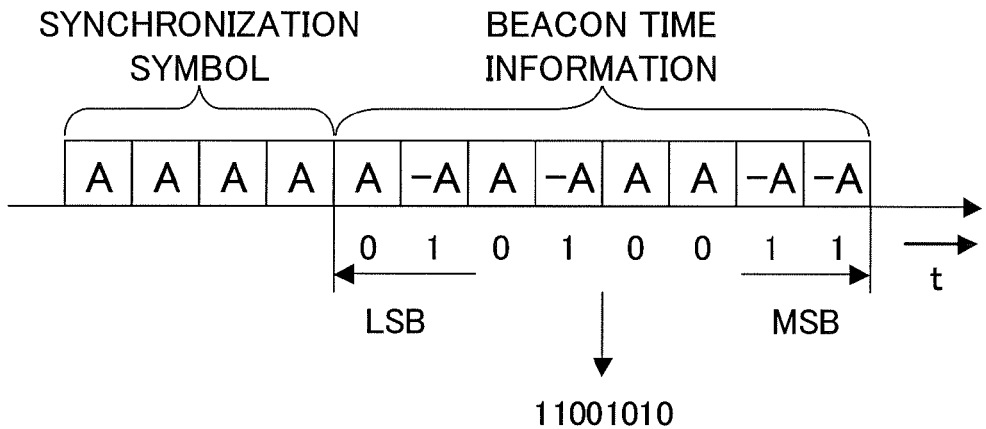
FIG. 5 is a diagram illustrating an exemplary format of a sub-beacon.

FIG. 5 is a diagram illustrating an exemplary format of a sub-beacon. In FIG. 5, time advances from left to right.

As illustrated in FIG. 5, the sub-beacon of the present embodiment is represented as a combination of a specific symbol pattern "A" and a symbol pattern "−A" in opposite phase with respect to the specific symbol pattern.

At the head of the sub-beacon, a synchronization symbol is arranged, and followed by the beacon time information which indicates the amount of time until arrival of the subsequent beacon and is arranged in order from LSB (Least Significant Bit) to MSB (Most Significant Bit).

In the example illustrated in FIG. 5, four synchronization symbols are arranged, and followed by the beacon time information representing "11001010" because "A" represents 0 and "−A" represents 1. Here, assuming that the minimum time unit (resolution) which can be represented by the beacon time information is 0.1 msec, since binary-coded decimal numerals "11001010" represent decimal numerals "202", the amount of time until arrival of the subsequent beacon is 202×0.1 msec=20.2 msec. In this manner, the beacon time information can arbitrarily express any amount of time by increase of the number of digits of the beacon time information or by alteration of the resolution. Further, values of the number of digits of the beacon time information and the resolution may be preliminarily registered on a transmission side and on a reception side, or may be transmitted every time the sub-beacon is transmitted, with the values of the number of digits of the beacon time information and the resolution being arranged behind MSB of the sub-beacon, or further alternatively, may be separately transmitted at a timing different from that of the sub-beacon transmission.

In this manner, the sub-beacon which can be modulated or demodulated by a simple structure is transmitted, so that the communication terminal which does not synchronize with the beacon time period can be promptly set in a sleep state.

The reason why the beacon time information is arranged in order from LSB but not from MSB is described below.

Figure 6:
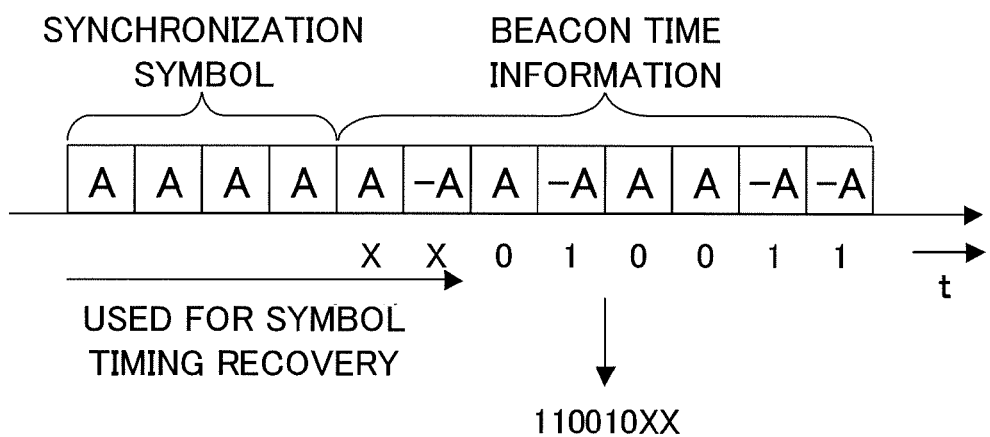

FIG. 6 is a diagram illustrating a reception condition in the case where data is defective due to a radio interference, signal deterioration or the like. In FIG. 6, time advances from left to right.

In the present invention, a pattern necessary for synchronization in symbol detection is more simplified in comparison with a preamble used in the data communication. This is because such a structure is preferable to minimize used amount of power for reception of the sub-beacon performed by the communication terminal.

However, defectiveness of data due to a radio interference, signal deterioration or the like often occurs in the head of the data.

FIG. 6 illustrates the case where beacon time information, for example, of "110010XX" (here, a value of X is unknown due to defectiveness of data) is received. It is assumed that a part of data corresponding to six symbols from the beginning is not received, so that among the eight-bits beacon time information, more significant six digits can be received but values of the last two digits are unknown. In this case, it can be estimated that the amount of time until arrival of the subsequent beacon is 20 msec or more but not exceeding 20.3 msec. Consequently, the amount of time within at least 20 msec can be identified as the inactive interval, so that processing may be advanced by setting unknown values of the last two digits to 0, and accordingly setting the beacon time information to be 20 msec.

As described above, defectiveness of data often occurs at the head of data to be transmitted, so that when the beacon time information having a plurality of digits is transmitted from the less significant digit, though defectiveness of data occurs, the defectiveness finishes in a less-significant-digit portion. Accordingly, when 0 is set to the missing digit, a supply of power to the units related to a wireless communication function is stopped with a small error probability (in the exemplary case, the error is 0.3 msec at a maximum). Further, such method is effective in the case where the communication terminal starts reception of a sub-beacon in the midst of transmission of the sub-beacon.

Figure 7:
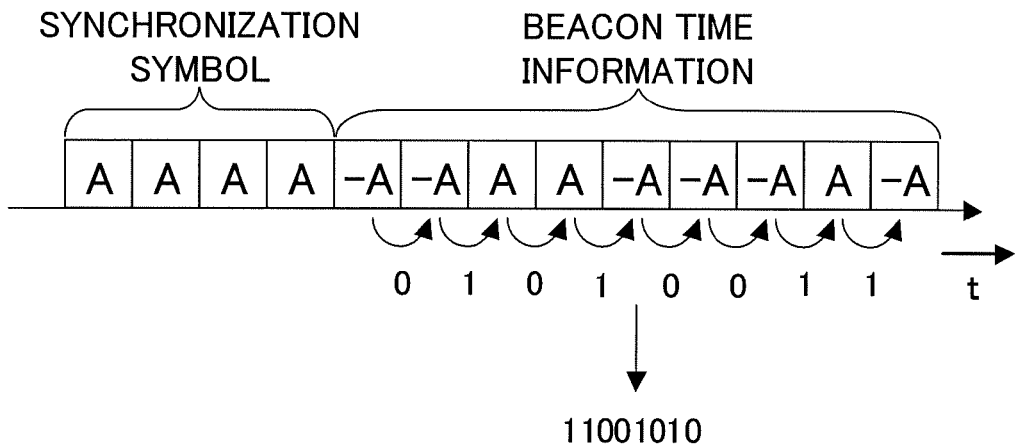
FIG. 7 is a diagram illustrating another exemplary format of the sub-beacon.

FIG. 7 illustrates another exemplary format of the sub-beacon. In FIG. 7, time advances from left to right.

The sub-beacon illustrated in FIG. 7 is, like the example illustrated in FIG. 5, represented as a combination of the specific symbol pattern "A" and the symbol pattern "–A" in opposite phase with respect to the specific symbol pattern.

Like the example of FIG. 5, at the head of the sub-beacon, the synchronization symbol is arranged, and followed by the beacon time information which indicates the amount of time until the subsequent beacon arrives, in order from LSB to MSB.

In the example illustrated in FIG. 7, four synchronization symbols are arranged, and the following symbols are differentially-encoded such that 0 represents the consecutive same symbol patterns, and 1 represents a change of symbol patterns, whereby the beacon time information illustrated in FIG. 7 is represented as "11001010".

Alternatively, a modulation method used for the sub-beacon signals can be the same as a modulation method for transmission data. In such a case, the sub-beacon modulation section 115 becomes unnecessary in the base station 110, and the synchronous modulation section 114 modulates the beacon time information, generates sub-beacon signals, and outputs the generated sub-beacon signals to the radio-frequency section 112. Similarly, the sub-beacon demodulation section 125 becomes unnecessary in the communication terminals 120, and the synchronous demodulation section 123 demodulates sub-beacon signals, and outputs the demodulated sub-beacon signals to the sub-beacon reception control section 130 in the communication control section 126.

<Operation>

Figure 8:
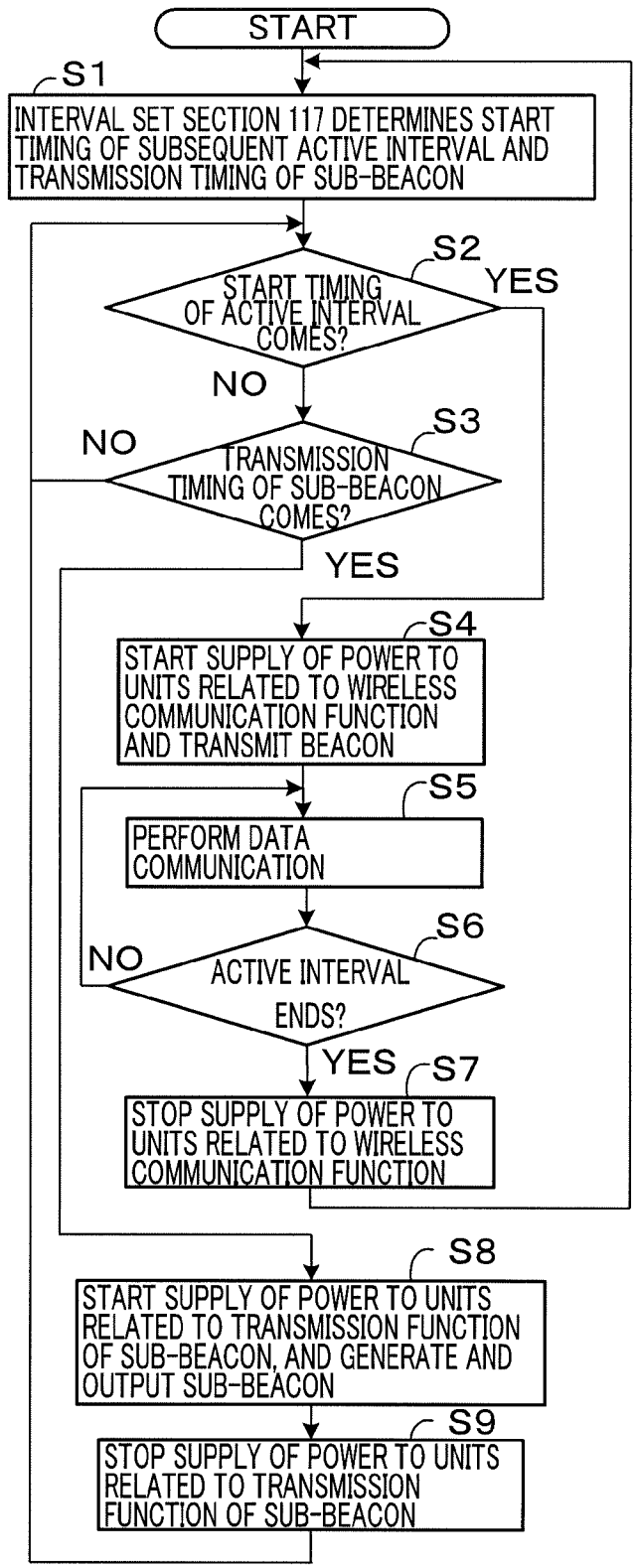
FIG. 8 is a diagram illustrating operation steps of transmission and reception processing performed in the base station 110 of the present embodiment.

FIG. 8 is a diagram illustrating operation steps of transmission and reception processing performed by the base station 110 of the present embodiment.

Here, the operation steps in the case where a supply of power to units related to a wireless communication function is stopped in an inactive interval are described.

(1) The interval set section 117 determines a start timing of a subsequent active interval as well as a transmission timing of a sub-beacon based on a user's selection or a preliminarily set rule (step S1). At this time, power is not supplied to the units related to the wireless communication function.

(2) Wait until a start timing of the active interval comes (step S2).

(3) Wait until a transmission timing of the sub-beacon comes (step S3).

(4) At the start timing of the active interval, a supply of power to the units related to the wireless communication function is started, and the synchronous communication control section 118, the synchronous modulation section 114, and the radio-frequency section 112 transmit a beacon by use of the antenna 111 (step S4).

(5) Beacon transmission is followed by data communication, until the active interval ends, performed by the radio-frequency section 112, the synchronous demodulation section 113, the synchronous modulation section 114, the communication control section 116, and the synchronous communication control section 118 (step S5).

(6) Wait until the active interval ends (step S6).

(7) When the active interval ends, a supply of power to the units related to the wireless communication function is stopped and the processing returns to setting processing performed by the interval set section 117 (step S7).

(8) At the transmission timing of the sub-beacon, a supply of power to units related to a sub-beacon transmission function is started, and the sub-beacon is generated via the radio-frequency section 112, the sub-beacon modulation section 115, and the sub-beacon transmission control section 119 and transmitted by use of the antenna 111 (step S8).

(9) When the transmission of the sub-beacon ends, a supply of power to the units related to the sub-beacon transmission function is stopped, and the processing return to waiting for the start timing of an active interval, and a transmission timing of a sub-beacon (step S9).

Figure 9:
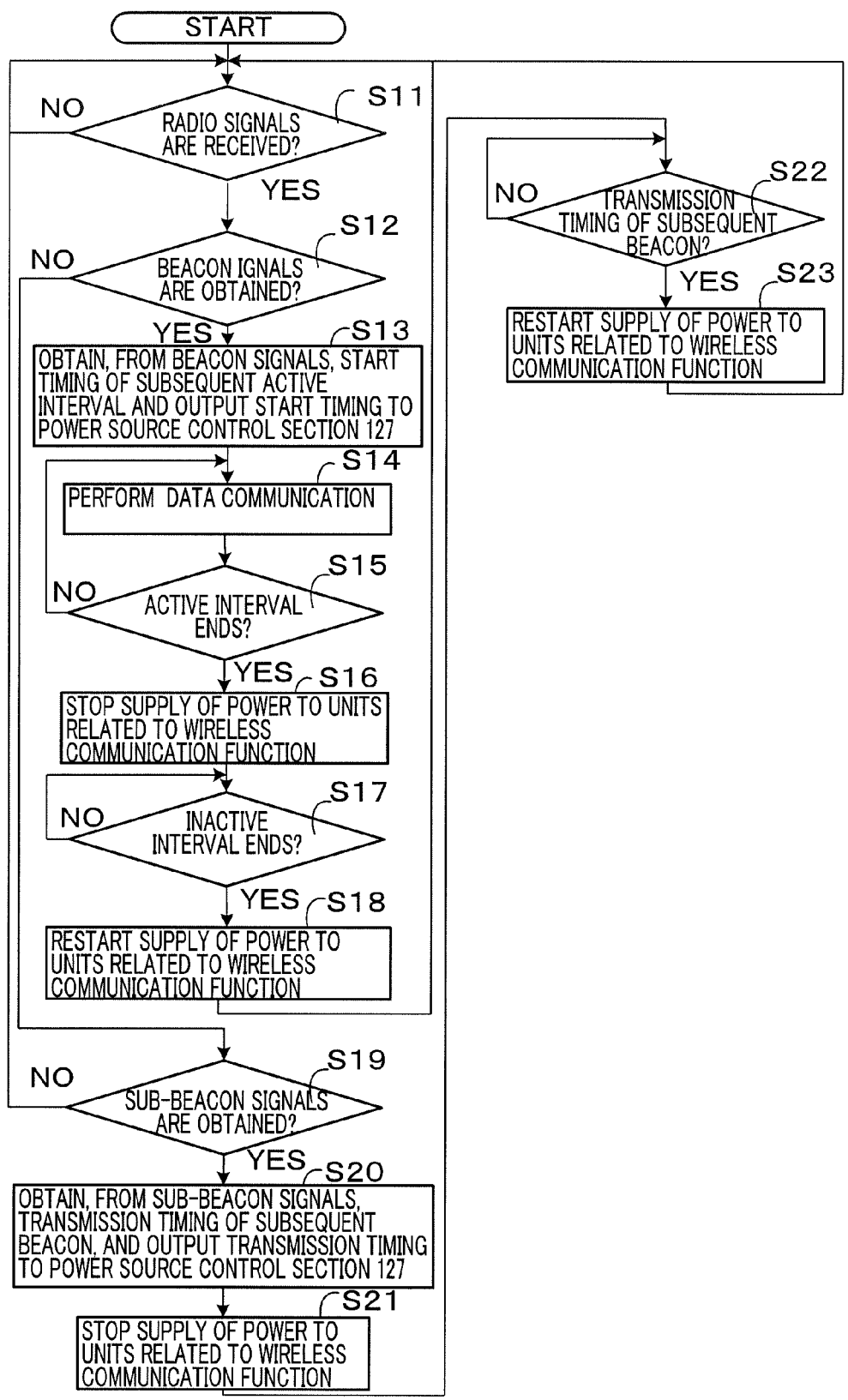
FIG. 9 is a diagram illustrating operation steps of transmission and reception processing performed in the communication terminal 120 of the present embodiment.

FIG. 9 is a diagram illustrating operation steps of transmission and reception processing by the communication terminals 120 of the present embodiment.

(1) Wait until the radio-frequency section 122 receives radio signals by use of the antenna 121 (step S11). At this time, power is supplied to the units related to the wireless communication function.

(2) When the radio signals are received by the radio-frequency section 122, whether or not beacon signals is obtained is determined by the synchronous demodulation section 123 and the synchronous communication control section 129 (step S12).

(3) When the beacon signals are obtained, a start timing of the subsequent active interval is obtained from the beacon signals and outputted to the power source control section 127 (step S13).

(4) When reception of the beacon is completed, data communication is performed by the antenna 121, the radio-frequency section 122, the synchronous demodulation section 123, the synchronous modulation section 124, the communication control section 126, and the synchronous communication control section 129 until the active interval ends (step S14).

(5) Wait until the active interval ends (step S15).

(6) When the active interval ends, a supply of power to the units related to the wireless communication function is stopped (step S16).

(7) Wait until an inactive interval ends (step S17).

(8) When the inactive interval ends, a supply of power to the units related to the wireless communication function is restarted, and the processing returns to waiting for reception of radio signals (step S18).

(9) When the beacon signals are not obtained, whether or not sub-beacon signals are obtained is determined by the sub-beacon demodulation section 125 and the sub-beacon reception control section 130 (step S19). When the sub-beacon signals are not obtained, the processing returns to waiting for reception of radio signals.

(10) When the sub-beacon signals are obtained, transmission timing of the subsequent beacon is obtained from the sub-beacon signals and outputted to the power source control section 127 (step S20).

(11) When reception of the sub-beacon signals ends, a supply of power to the units related to the wireless communication function is stopped (step S21).

(12) Wait until the transmission timing of the subsequent beacon (step S22).

(13) At the transmission timing of the subsequent beacon, a supply of power to the units related to the wireless communication function is restarted, and the processing returns to waiting for reception of radio signals (step S23).

Figure 10:
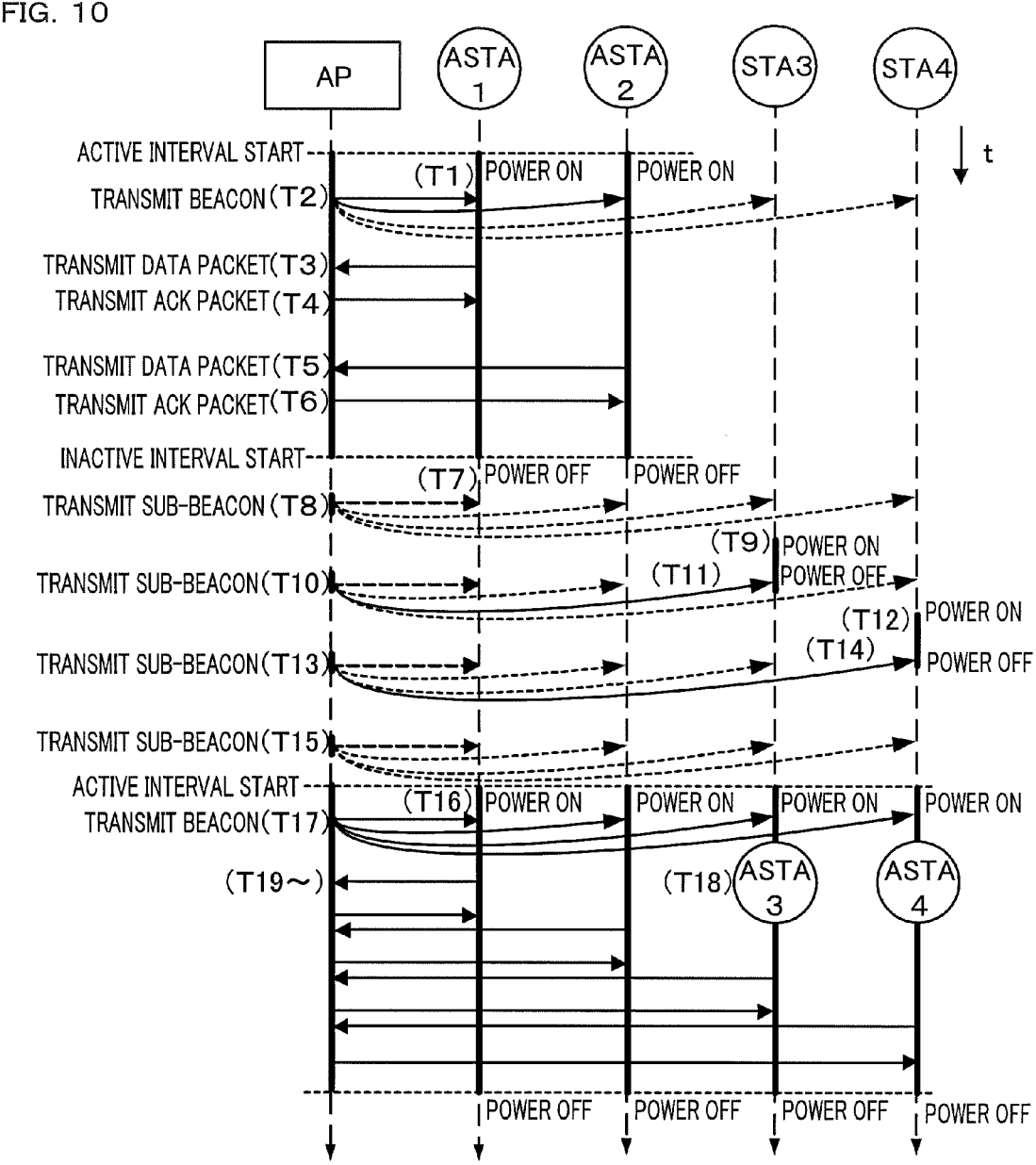
FIG. 10 is a diagram illustrating an exemplary synchronization sequence performed in the wireless communication system 100 according to the first embodiment.

FIG. 10 is an exemplary synchronization sequence performed by the wireless communication system 100 according to the first embodiment. In FIG. 10, time advances from the top downward. The respective vertical solid lines represent states in which power is supplied to the units related to the wireless communication function. The respective vertical dashed lines represent states in which power is not supplied to all or a part of the units related to the communication function. Further, the respective horizontal solid lines represent valid communication, and the respective horizontal dashed lines represent invalid communication.

In the present embodiment, the base station 110 is referred to as "AP". The AP is an abbreviation of an Access Point.

Further, the communication terminals 150 and 160, which have not received a beacon yet, and do not synchronized with the base station 110, are referred to as "STA3" and "STA4", respectively. The STA is an abbreviation of a Station.

Still further, the communication terminals 120 and 140, which have already received a beacon and synchronize with the base station 110, are referred to as "ASTA1" and "ASTA2", respectively. The ASTA is an abbreviation of an Associated Station.

(1) When the active interval starts, a supply of power to the units related to the wireless communication function is restarted by the respective ASTA1 and ASTA2 (T1).

(2) Immediately after the start of the active interval, a beacon is transmitted by the AP toward the ASTA and the STA located therearound. At this time, since power is supplied to the units related to the wireless communication function, the ASTA1 and the ASTA2 are capable of receiving the beacon, thereby obtaining control data included in the beacon. At this point, the STA3 and the STA4 do not participate in the system for the reason, for example, that apparatuses themselves are not powered on, thereby not receiving the beacon (T2).

(3) The ASTA1 recognizes, based on the control data included in the beacon, a period of time during the active interval in which radio signals are allowed to be transmitted. Thereafter, ASTA1 transmits a data packet to the AP during the period of time in which communication is allowed (T3).

(4) After a data packet is transmitted by the ASTA1, the AP transmits, to the ASTA1, an ACK packet informing the ASTA1 that the data packet is successfully received (T4).

(5) Like the ASTA1, the ASTA2 transmits a data packet to the AP during a period of time in which communication is allowed (T5).

(6) After the ASTA2 transmits the data packet, the AP transmits, to the ASTA2, an ACK packet informing the ASTA2 that the data packet is successfully received (T6).

As described above, during the active interval, the transmission timings of the AP and the respective ASTA are controlled based on the control data included in the beacon.

(7) When the inactive interval starts, the ASTA1 and the ASTA2 each stop a supply of power to the units related to the wireless communication function until the subsequent active interval starts (T7).

(8) During the inactive interval, the AP transmits sub-beacons (T8 and after).

(9) Here, it is assumed that, from when the first sub-beacon is transmitted (T8) to when the second sub-beacon is transmitted (T10), the STA3 starts reception of the beacon and the sub-beacon in order to participate in the system (T9).

(10) The STA3 receives the second sub-beacon which is transmitted by the AP (T10).

(11) The STA3 extracts the beacon time information from the received sub-beacon, and stops a supply of power to the units related to the wireless communication function until the transmission timing of the subsequent beacon (T11).

(12) Here, it is assumed that, from when the second sub-beacon is transmitted (T10) to when the third sub-beacon is transmitted (T13), the STA4 starts reception of the beacon and the sub-beacon in order to participate in the system (T12).

(13) The STA4 receives the third sub-beacon which is transmitted by the AP (T13).

(14) The STA4 extracts the beacon time information from the received sub-beacon, and stops a supply of power to the units related to the wireless communication function until the transmission timing of the subsequent beacon (T14).

(15) When the AP transmits the fourth sub-beacon, since all of the wireless communication functions of the ASTA and the STA located therearound are halted, the fourth sub-beacon is not received (T15).

(16) When the second active interval starts, the ASTA1, the ASTA2, the STA3, and the STA4 each restart a supply of power to the units related to the wireless communication function (T16).

(17) Immediately after the second active interval starts, the AP transmits a beacon toward the ASTA and the STA located therearound. At this time, since a supply of power to the units related to the wireless communication function is performed, the ASTA1 and the ASTA2 are capable of receiving the beacon, thereby acquiring the control data included in the beacon. Similarly, since power is supplied to the units related to the wireless communication function in the respective STA3 and STA4, STA3 and STA4 are capable of receiving the beacon, thereby acquiring the control data included in the beacon (T17).

(18) The STA3 and the STA4 each synchronize with the base station 110 by acquiring the control data included in the beacon so as to become the ASTA3 and the ASTA4, respectively (T18).

(19) Like in the above-described active interval, each of the ASTA recognizes, based on the control data included in the beacon, a period of time during the active interval in which radio signals are allowed to be transmitted, and transmits a data packet to the AP during the period of time in which communication is allowed. The AP returns an ACK packet (T19 and after).

<Conclusion>

As described above, by transmitting a sub-beacon indicating a transmission timing of the subsequent beacon during the inactive interval, the AP is capable of promptly causing the STA which does not synchronize with the beacon time period to be set in a sleep state. Further, the sub-beacon is transmitted, which can be modulated or demodulated by a simple structure, so that the communication terminal which does not synchronize with the beacon time period can be promptly set in a sleep state. Consequently, wasteful power consumption in each of the STA is minimized and power consumption is reduced.

[Second Embodiment]

<Outline>

The present embodiment, like the first embodiment, when using a beacon mode in a compact and low power consumption wireless communication system, allows a base station to transmit a sub-beacon providing notice of a transmission timing of a subsequent beacon during an active interval as well as an inactive interval so as to allow the communication terminal to receive the sub-beacon even during the active interval.

<Structure>

The structure of the wireless communication system according to the second embodiment is similar to that of the wireless communication system 100 according to the first embodiment.

Figure 11:
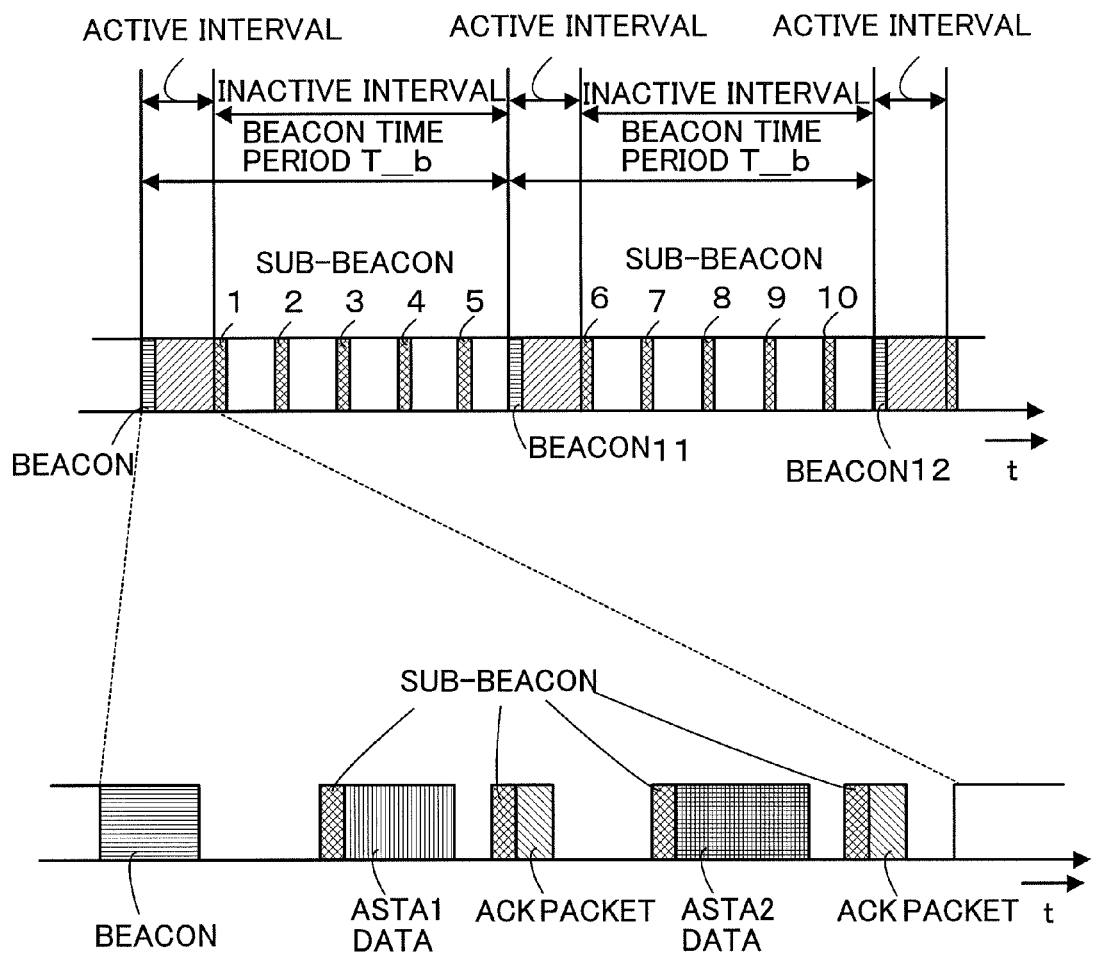
FIG. 11 is a diagram illustrating an outline of the beacon mode in the wireless communication system of the present embodiment.

FIG. 11 is a diagram illustrating an outline of a beacon mode in the wireless communication system of the present embodiment.

In FIG. 11, time advances from left to right, and an active interval and an inactive interval are set to be alternately repeated.

In comparison with the outline of the beacon mode of the first embodiment illustrated in FIG. 3, FIG. 11 is different in that the sub-beacon is added at the head of each wireless packet which is transmitted during the active interval.

Figure 12:
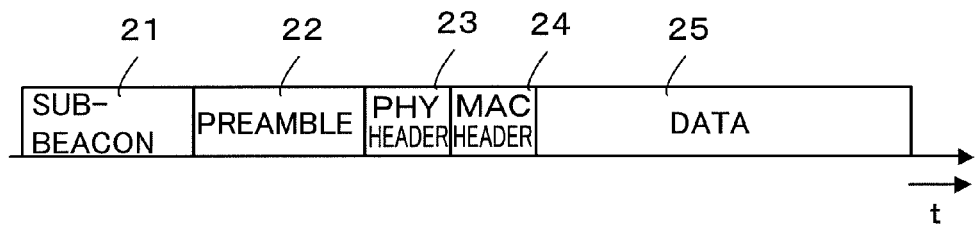
FIG. 12 is a diagram illustrating an exemplary format of a wireless packet illustrated in FIG. 11.

FIG. 12 is an exemplary format of the wireless packet illustrated in FIG. 11.

As illustrated in FIG. 12, the wireless packet includes a sub-beacon 21, a preamble 22, a PHY (PHYsical Layer) header 23, a MAC (Media Access Control) header 24, and data 25.

The sub-beacon 21 has a structure similar to that illustrated in FIG. 5 of the first embodiment, and description thereof is omitted.

The preamble 22 is a known signal, and mainly used for symbol synchronization of the wireless packet.

The PHY header 23 mainly includes information related to a modulation method used for demodulation of the MAC header 24 and data 25 of the wireless packet, and information indicating a starting position and a data length of the data.

The MAC header 24 mainly includes parameters necessary for accessing source ID information, destination ID information, a control command or the like of the wireless packet, and information indicating data type of the data 25.

The data 25 mainly includes transmission data and control data.

The sub-beacon is not necessarily added to all of the wireless packets but it is preferable that the sub-beacon is added periodically or non-periodically at proper intervals.

Further, a sub-beacon is not necessary for a wireless packet of a beacon, so that a wireless packet, in which the sub-beacon 21 is excluded from the wireless packet illustrated in FIG. 12, that is, including the remaining preamble 22, the PHY header 23, the MAC header 24, and the data 25 may be used.

Still further, symbol synchronization of the wireless packet may be executed by the sub-beacon 21. In such a case, the preamble 22 is unnecessary, so that a wireless packet, in which the preamble 22 is excluded from the wireless packet illustrated in FIG. 12, that is, including the remaining sub-beacon 21, the PHY header 23, the MAC header 24, and the data 25 may be used.

<Operation>

Operation steps of transmission and reception processing are similar to those performed in the wireless communication system 100 according to the first embodiment.

Figure 13:
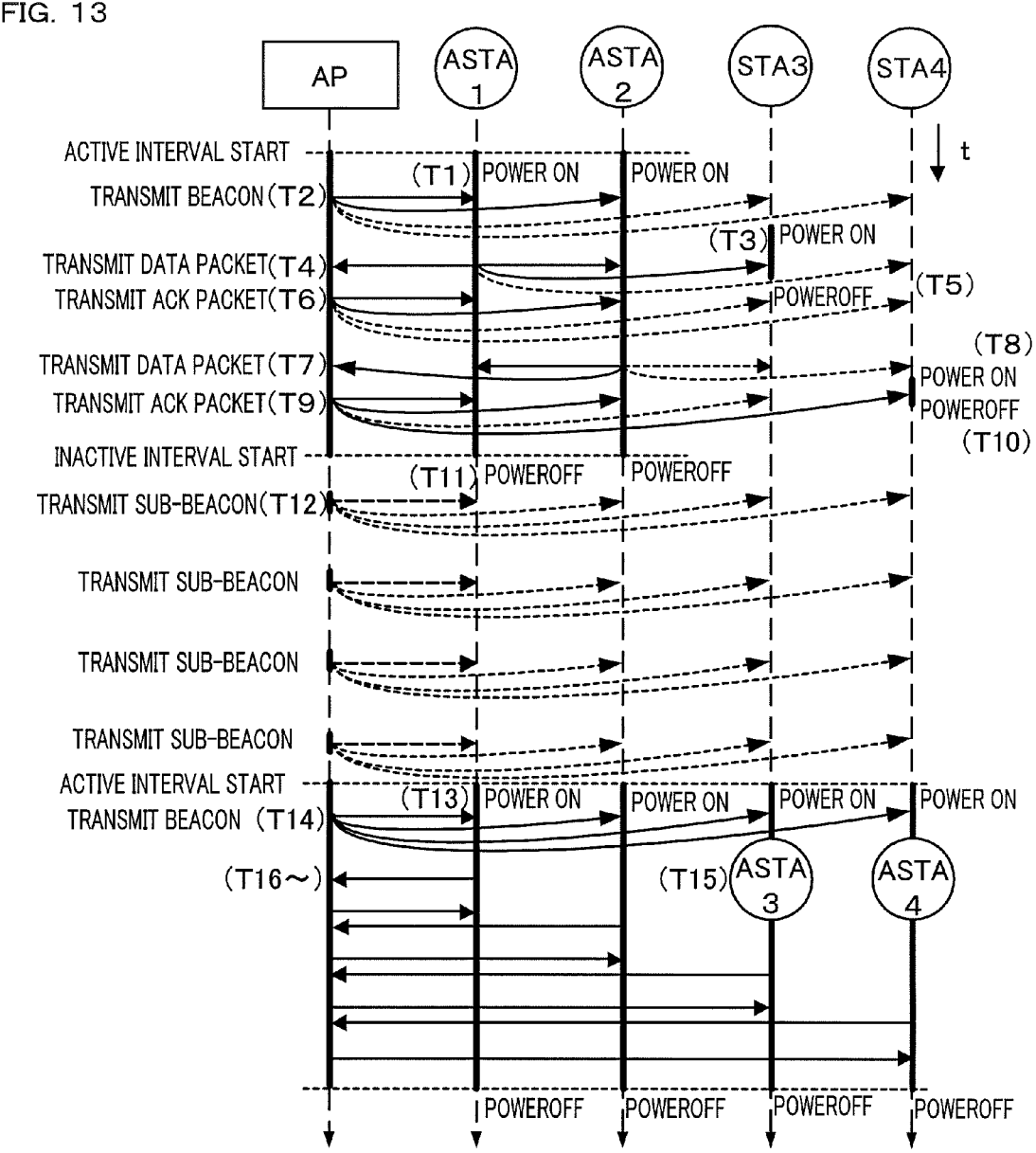
FIG. 13 is a diagram illustrating an exemplary synchronization sequence performed in a wireless communication system 200 according to a second embodiment.

FIG. 13 is an exemplary synchronization sequence performed by the wireless communication system according to the second embodiment. In FIG. 13, time advances from the top downward. The respective vertical solid lines represent states in which power is supplied to the units related to the wireless communication function. The respective vertical dashed lines represent states in which power is not supplied to all or a part of the units related to the communication function. Further, the respective horizontal solid lines represent valid communication, and the respective horizontal dashed lines represent invalid communication.

In the present embodiment, the base station 110 is referred to as "AP".

Further, the communication terminals 150 and 160, which have not received a beacon yet and do not synchronized with the base station 110, are referred to as "STA3" and "STA4", respectively.

Still further, the communication terminals 120 and 140, which have already received a beacon and synchronize with the base station 110, are referred to as "ASTA1" and "ASTA2", respectively.

(1) When the active interval starts, a supply of power to the units related to the wireless communication function is restarted by the respective ASTA1 and ASTA2 (T1).

(2) Immediately after the start of the active interval, a beacon is transmitted by the AP toward the ASTA and the STA located therearound. At this time, since power is supplied to the units related to the wireless communication function, the ASTA1 and the ASTA2 are capable of receiving the beacon, thereby obtaining control data included in the beacon. At this point, the STA3 and the STA4 do not participate in the system for the reason, for example, that apparatuses themselves are not powered on, thereby not receiving the beacon (T2).

(3) Here, it is assumed that, from the time (T2) at which the beacon is transmitted to the time (T4) when another data communication is performed, the STA3 starts reception of the beacon and the sub-beacon in order to participate in the system (T3).

(4) The ASTA1 recognizes, based on the control data included in the beacon, a period of time during the active interval in which radio signals are allowed to be transmitted. Thereafter, ASTA1 transmits a data packet to the AP during the period of time in which communication is allowed (T4). At this time, a sub-beacon including beacon time information indicating a transmission timing of the subsequent beacon is added at the head of the data packet which is transmitted by the ASTA1.

(5) When receiving the sub-beacon added at the head of the data packet which is transmitted by the ASTA1, the STA3 extracts the beacon time information from the received sub-beacon, and stops a supply of power to the units related to the wireless communication function until a transmission timing of the subsequent beacon (T5).

(6) After a data packet is transmitted by the ASTA1, the AP transmits, to the ASTA1, an ACK packet informing the ASTA1 that the data packet is successfully received (T6). At this time, a sub-beacon is added at the head of an ACK packet which is transmitted by the AP.

(7) Like the ASTA1, the ASTA2 transmits a data packet to the AP during a period of time in which communication is allowed (T7). At this time, a sub-beacon is added at the head of a data packet which is transmitted to the AP.

(8) Here, it is assumed that, from (T7) when the data packet is transmitted to (T9) when the ACK packet is transmitted, the STA4 starts reception of the beacon and the sub-beacon in order to participate in the system (T8).

(9) After the ASTA2 transmits the data packet, the AP transmits, to the ASTA2, an ACK packet informing the ASTA2 that the data packet is successfully received (T9). At this time, a sub-beacon is added at the head of the ACK packet which is transmitted by the AP.

(10) When receiving the sub-beacon added at the head of the data packet which is transmitted by the AP, the STA4 extracts the beacon time information from the received sub-beacon, and stops a supply of power to the units related to the wireless communication function until a transmission timing of the subsequent beacon (T10).

As described above, during the active interval, the transmission timings of the AP and the respective ASTA are controlled based on the control data included in the beacon.

(11) When the inactive interval starts, the ASTA1 and the ASTA2 each stop a supply of power to the units related to the wireless communication function until the subsequent active interval starts (T11).

(12) During the inactive interval, the AP transmits sub-beacons (T12 and after).

When the AP transmits four sub-beacons, since all of the wireless communication functions of the ASTA and STA located therearound are halted, the sub-beacons are not received.

(13) When the second active interval starts, the ASTA1, the ASTA2, the STA3, and the STA4 each restart a supply of power to the units related to the wireless communication function (T13).

(14) Immediately after the second active interval starts, the AP transmits a beacon toward the ASTA and the STA located therearound. At this time, since a supply of power to the unit s related to the wireless communication function is performed, the ASTA1 and the ASTA2 are capable of receiving the beacon, thereby acquiring the control data included in the beacon. Similarly, since power is supplied to the units related to the wireless communication function in the respective STA3 and STA4, the STA3 and the STA4 are capable of receiving the beacon, thereby acquiring the control data included in the beacon (T14).

(15) The STA3 and the STA4 each synchronize with the base station 110 by acquiring the control data included in the beacon so as to become the ASTA3 and the ASTA4, respectively (T15).

(16) Like in the above-described active interval, each of the ASTA recognizes, based on the control data included in the beacon, a period of time during the active interval in which wireless signals are allowed to be transmitted, and transmits a data packet to the AP during the period of time in which communication is allowed. The AP returns an ACK packet (T16 and after).

<Conclusion>

As described above, by transmitting a sub-beacon indicating a transmission timing of the subsequent beacon during the inactive interval, the AP is capable of promptly causing the STA which does not synchronize with the beacon time period to be set in a sleep state. Further, the sub-beacon is transmitted, which can be modulated or demodulated by a simple structure, so that the communication terminal which does not synchronize with the beacon time period can be promptly set in a sleep state. Further, during the active interval, by adding sub-beacons at the respective heads of the wireless packets which are transmitted from the AP and the ASTA, respectively, without performing demodulation processing on the wireless packet, but only demodulating the sub-beacon positioned at the head of the wireless packet, the STA can be promptly set in a sleep state even during the active interval. Consequently, wasteful power consumption is minimized and power consumption is reduced.

The above-described embodiment may be realized by causing a CPU to execute a program stored in a storage device (ROM, RAM, hard disk or the like), which program allows the CPU to perform the above-described process steps. In this case, the program may be executed after being stored in the storage device via a storage medium, or the program may be directly executed on the storage medium. Here, the storage medium may be, for example: a semiconductor memory such as a ROM, RAM, flash memory or the like; a magnetic disk memory such as a flexible disc, hard disk or the like; an optical disc such as a CD-ROM, DVD, BD or the like; and a memory card. Here, referred to as a storage medium may also be a communication medium such as a telephone line or transmission path.

In the above-described embodiment of the present invention, the units related to the wireless communication function, the base station, the communication terminals, and the like are typically realized as LSIs which are integrated circuits. These function blocks each may be realized as an individual chip, or a chip which partly or entirely includes these function blocks may be provided. Alternatively, components, which are involved in communication performed within a system to which the components belong, may be provided as an individual LSI chip, and also components, which are involved in coexistence signal transmission/reception, may be provided as an individual LSI chip. Although these chips are referred to here as LSIs, these chips may be ICs, system LSIs, super LSIs or ultra LSIs, depending on an integration density thereof.

Further, the method of integration is not limited to the LSI, and may be realized by a dedicated circuit or a general purpose processor. Alternatively, an FPGA (Field Programmable Gate Array) which is programmable after manufacturing the LSI, or a reconfigurable processor enabling reconfiguration of connection or setting of a circuit cell in the LSI may be used.

Still further, in the case where another integration technology replacing the LSI becomes available due to an improvement of a semiconductor technology or due to emergence of another technology derived therefrom, the function blocks may be integrated using such a new technology. For example, biotechnology may be applied.

The communication apparatus of the present invention may be in the form of an adaptor which converts a signal interface, such as an Ethernet (registered trademark) interface, IEEE1394 interface, USB interface or the like, into an interface for power line communication. This enables the communication apparatus to be connected to multimedia apparatuses, such as a personal computer, DVD recorder, digital television, home server system and the like, which have various types of interfaces. This allows a network system, which is able to transmit, with a high speed, digital data such as multimedia data or the like by using a power line as a medium, to be constructed. As a result, unlike a conventional wired LAN, there is no necessity to newly place a network cable, and a power line already provided in homes, offices and the like can be used as a network line. Therefore, the present invention is considerably useful in terms of cost and ease of installation.

If, in the future, functions of the present invention are incorporated into multimedia apparatuses such as a personal computer, DVD recorder, digital television, home server system and the like, data transfer to be performed between the multimedia apparatuses via power codes thereof will be enabled. In this case, an adaptor, Ethernet (registered trademark) cable, IEEE1394 cable, USB cable and the like are no longer necessary, and thus wiring is simplified. The communication apparatus of the present invention can be connected via a rooter to the Internet. Also, the communication apparatus can be connected via a hub or the like to a wireless LAN or a conventional wired LAN. Therefore, there is no difficulty in extending the present invention.

While the invention has been described in detail, the foregoing description is in all aspects illustrative and not restrictive. While the invention has been described in detail, the foregoing description is in all aspects illustrative and not restrictive. Accordingly, it is understood that numerous other modifications and variations can be devised without departing from the scope of the invention.

Industrial Applicability

The wireless communication system of the present invention is applicable as a compact and low power consumption wireless communication system which is used for a sensor network such as: reading a meter of gas, electricity, water or the like; outdoors monitoring of an air pollution concentration, a pollen count, a temperature or the like; a home security system like a fire-alarm box, an entrance detection sensor or the like; and location management of a child, an elderly person or the like. Further, the base station, during the inactive interval, transmits the sub-beacon indicating the transmission timing of the subsequent beacon, and the communication terminal receives the sub-beacon and stops a supply of power to the communication function until the transmission timing of the subsequent beacon. Consequently, power consumption is reduced when the communication terminal does not recognize the transmission timing of the subsequent beacon and the present invention has a great deal of potential in industry.

Reference Signs List
- 100 wireless communication system
- 110 base station
- 111 antenna
- 112 radio-frequency section
- 113 synchronous demodulation section
- 114 synchronous modulation section
- 115 sub-beacon modulation section
- 116 communication control section
- 117 interval set section
- 118 synchronous communication control section
- 119 sub-beacon transmission control section
- 120 communication terminal
- 121 antenna
- 122 radio-frequency section
- 123 synchronous demodulation section
- 124 synchronous modulation section
- 125 sub-beacon demodulation section
- 126 communication control section
- 127 power source control section
- 128 power source section
- 129 synchronous communication control section
- 130 sub-beacon reception control section
- 140, 150, 160 communication terminal
- 200 wireless communication system

The invention claimed is:

1. A wireless communication apparatus which performs, with a communication terminal, predetermined data communication during an active interval, and does not perform the predetermined data communication during an inactive interval, the wireless communication apparatus comprising:
   an interval set section that alternately sets the active interval and the inactive interval;
   a base station communication section that performs the predetermined data communication with the communication terminal as well as transmitting a beacon, after performing a first modulation on the beacon, to the communication terminal during the active interval which is set by the interval set section, the beacon including information indicating a start timing of a subsequent active interval which is set by the interval set section; and
   a sub-beacon transmission section that transmits a sub-beacon to the communication terminal during the inactive interval, after performing a second modulation, which is a modulation method simpler than that used in the first modulation, on the sub-beacon including time information and a synchronization symbol, the time information providing notice of a transmission timing of a subsequent beacon which is to be transmitted by the base station communication section.

2. The wireless communication apparatus according to claim 1, wherein the sub-beacon transmission section transmits the sub-beacon multiple times during the inactive interval, and the sub-beacon transmitted each time includes, as the time information, information indicating an amount of time from a transmission timing at which the own sub-beacon is transmitted until the transmission timing of the subsequent beacon.

3. The wireless communication apparatus according to claim 1, wherein the time information included in the sub-beacon is information having a plurality of digits, and the sub-beacon transmission section transmits a more significant digit of the time information later than a less significant digit thereof.

4. The wireless communication apparatus according to claim 1, wherein the sub-beacon transmission section transmits the sub-beacon to the communication terminal during the active interval as well as the inactive interval.

5. A communication terminal which performs, with a base station alternately setting an active interval and an inactive interval, predetermined data communication during the active interval, and does not perform the predetermined data communication during the inactive interval, the communication terminal comprising:
   a terminal communication section that performs the predetermined data communication with the base station as well as receiving, from the base station, during the active interval, a beacon including information indicating a start timing of a subsequent active interval so as to obtain the start timing of the subsequent active interval;
   a sub-beacon reception section that receives from the base station, when the start timing of the subsequent active interval is not obtained by the terminal communication section, a sub-beacon which provides notice of a transmission timing of a subsequent beacon so as to obtain the transmission timing at which the subsequent beacon is transmitted; and
   a power supply control section that stops, when the start timing of the subsequent active interval is obtained by the terminal communication section, a supply of power to units related to a wireless communication function, the units including the terminal communication section and the sub-beacon reception section, after the end of the predetermined data communication until the start timing, and stops, when the transmission timing at which the subsequent beacon is transmitted is obtained by the sub-beacon reception section, the supply of power to the units related to the wireless communication function until the transmission timing, wherein the sub-beacon includes time information having a plurality of digits as information providing notice of the transmission timing of the subsequent beacon, and a more significant digit of the time information is transmitted later than a less significant digit thereof, and wherein when the sub-beacon reception section receives the sub-beacon so as to obtain the time information from the sub-beacon, and in the case where cancellation of significant digits occurs at the less significant digit portion of the time information but the more significant digit portion of the time information is successfully received, the sub-beacon reception section replaces the less significant digit portion at which the cancellation of significant digits occurs with a predetermined value so as to set an earliest timing among possible transmission timings of the subsequent beacon to be the transmission timing of the subsequent beacon.

6. The communication terminal according to claim 5, wherein the sub-beacon is transmitted multiple times from the base station during the inactive interval, and the sub-beacon transmitted each time includes information indicating an amount of time from a transmission timing at which the own sub-beacon is transmitted until the transmission timing of the subsequent beacon, the sub-beacon reception section, when receiving the sub-beacon, obtains from the sub-beacon the amount of time until the transmission timing of the subsequent beacon, and the power supply control section stops the supply of power to the units related to the wireless communication function until the transmission timing of the subsequent beacon, the transmission timing being obtained by the sub-beacon reception section.

7. The communication terminal according to claim 5, wherein the terminal communication section further transmits the sub-beacon when performing the predetermined data communication during the active interval; and the sub-beacon reception section further receives from another communication terminal, when the terminal communication section does not obtain the start timing of the subsequent active interval, a sub-beacon providing notice of the transmission timing of the subsequent beacon so as to obtain the transmission timing at which the subsequent beacon is transmitted.

8. A wireless communication system comprising a base station and a communication terminal, which performs, between the base station and the communication terminal, predetermined data communication during an active interval, and does not perform the predetermined data communication during an inactive interval, wherein the base station includes:
an interval set section that alternately sets the active interval and the inactive interval;
a base station communication section that performs the predetermined data communication with the communication terminal as well as transmitting a beacon, after performing a first modulation on the beacon, to the communication terminal during the active interval which is set by the interval set section, the beacon including information indicating a start timing of a subsequent active interval which is set by the interval set section; and
a sub-beacon transmission section that transmits a sub-beacon to the communication terminal during the inactive interval, after performing a second modulation, which is a modulation method simpler than that used in the first modulation, on the sub-beacon including time information and a synchronization symbol, the time information providing notice of a transmission timing of a subsequent beacon which is to be transmitted by the base station communication section, and the communication terminal includes:
a terminal communication section that performs the predetermined data communication with the base station as well as receiving the beacon from the base station during the active interval so as to obtain the start timing of the subsequent active interval;
a sub-beacon reception section that receives the sub-beacon from the base station when the start timing of the subsequent active interval is not obtained by the terminal communication section, so as to obtain the transmission timing at which the subsequent beacon is transmitted; and
a power supply control section that stops, when the start timing of the subsequent active interval is obtained by the terminal communication section, a supply of power to units related to a wireless communication function, the units including the terminal communication section and the sub-beacon reception section, after the end of the predetermined data communication until the start timing, and stops, when the transmission timing at which the subsequent beacon is transmitted is obtained by the sub-beacon reception section, the supply of power to the units related to the wireless communication function until the transmission timing, wherein the sub-beacon includes time information having a plurality of digits as information providing notice of the transmission timing of the subsequent beacon, and a more significant digit of the time information is transmitted later than a less significant digit thereof, and wherein when the sub-beacon reception section receives the sub-beacon so as to obtain the time information from the sub-beacon, and in the case where cancellation of significant digits occurs at the less significant digit portion of the time information but the more significant digit portion of the time information is successfully received, the sub-beacon reception section replaces the less significant digit portion at which the cancellation of significant digits occurs with a predetermined value so as to set an earliest timing among possible transmission timings of the subsequent beacon to be the transmission timing of the subsequent beacon.

9. A wireless communication program stored in a non-transitory storage medium to be executed by a wireless communication apparatus which performs, with a communication terminal, predetermined data communication during an active interval, and does not perform the predetermined data communication during an inactive interval, the program causing the wireless communication apparatus to execute:

an interval set step of alternately setting the active interval and the inactive interval;
a base station communication step of performing the predetermined data communication with the communication terminal as well as transmitting a beacon, after performing a first modulation on the beacon, to the communication terminal during the active interval which is set in the interval set step, the beacon including information indicating a start timing of a subsequent active interval which is set in the interval set step; and a sub-beacon transmission step of transmitting a sub-beacon to the communication terminal during the inactive interval, after performing a second modulation, which is a modulation method simpler than that used in the first modulation, on the sub-beacon including time information and a synchronization symbol, the time information providing notice of a transmission timing of a subsequent beacon which is to be transmitted in the base station communication step.

10. A communication terminal program stored in a non-transitory storage medium to be executed by a communication terminal which performs, with a base station alternately setting an active interval and an inactive interval, predetermined data communication during the active interval, and does not perform the predetermined data communication during the inactive interval, the program causing the communication terminal to execute:

a terminal communication step of performing the predetermined data communication with the base station and receiving, from the base station, during the active interval, a beacon including information indicating a start timing of a subsequent active interval so as to obtain the start timing of the subsequent active interval;

a sub-beacon reception step of receiving from the base station, when the start timing of the subsequent active interval is not obtained in the terminal communication step, a sub-beacon which provides notice of a transmission timing of a subsequent beacon so as to obtain the transmission timing at which the subsequent beacon is transmitted; and a power supply control step of stopping, when the start timing of the subsequent active interval is obtained in the terminal communication step, a supply of power to an unit related to a wireless communication function, after the end of the predetermined data communication until the start timing, and stopping, when the transmission timing at which the subsequent beacon is transmitted is obtained in the sub-beacon reception step, the supply of power to the unit related to the wireless communication function until the transmission timing, wherein the sub-beacon includes time information having a plurality of digits as information providing notice of the transmission timing of the subsequent beacon, and a more significant digit of the time information is transmitted later than a less significant digit thereof, and wherein, in the sub-beacon reception step, when the sub-beacon is received and the time information is obtained from the sub-beacon, and in the case where cancellation of significant digits occurs at the less significant digit portion of the time information but the more significant digit portion of the time information is successfully received, the less significant digit portion at which the cancellation of the significant digits occurs is replaced with a predetermined value in the sub-beacon reception step, such that an earliest timing among possible transmission timings of the subsequent beacon is set to be the transmission timing of the subsequent beacon.

11. An integrated circuit to be used in a wireless communication apparatus which performs, with a communication terminal, predetermined data communication during an active interval, and does not perform the predetermined data communication during an inactive interval, the integrated circuit integrating circuits which act as:

an interval set section that alternately sets the active interval and the inactive interval;

a base station communication section that performs the predetermined data communication with the communication terminal as well as transmitting a beacon, after performing a first modulation, to the communication terminal during the active interval which is set by the interval set section, the beacon including information indicating a start timing of a subsequent active interval which is set by the interval set section; and a sub-beacon transmission section that transmits a sub-beacon to the communication terminal during the inactive interval, after performing a second modulation, which is a modulation method simpler than that used in the first modulation, on the sub-beacon including time information and a synchronization symbol, the time information providing notice of a transmission timing of a subsequent beacon which is to be transmitted by the base station communication section.

12. An integrated circuit to be used in a communication terminal which performs, with a base station alternately setting an active interval and an inactive interval, predetermined data communication during the active interval, and does not perform the predetermined data communication during the inactive interval, the integrated circuit integrating circuits which act as:

a terminal communication section that performs the predetermined data communication with the base station during the active interval, and receives, from the base station, a beacon including information indicating a start timing of a subsequent active interval so as to obtain the start timing of the subsequent active interval;

a sub-beacon reception section that receives from the base station, when the start timing of the subsequent active interval is not obtained by the terminal communication section, a sub-beacon which provides notice of a transmission timing of a subsequent beacon so as to obtain the transmission timing at which the subsequent beacon is transmitted; and a power supply control section that stops, when the start timing of the subsequent active interval is obtained by the terminal communication section, a supply of power to units related to a wireless communication function, the units including the terminal communication section and the sub-beacon reception section, after the end of the predetermined data communication until the start timing, and stops, when the transmission timing at which the subsequent beacon is transmitted is obtained by the sub-beacon reception section, the supply of power to the units related to the wireless communication function until the transmission timing, wherein the sub-beacon includes time information having a plurality of digits as information providing notice of the transmission timing of the subsequent beacon, and a more significant digit of the time information is transmitted later than a less significant digit thereof, and wherein when the sub-beacon reception section receives the sub-beacon so as to obtain the time information from the sub-beacon, and in the case where cancellation of significant digits occurs at the less significant digit portion of the time information but the more significant digit portion of the time information is successfully received, the sub-beacon reception section replaces the less significant digit portion at which the cancellation of significant digits occurs with a predetermined value so as to set an earliest timing among possible transmission timings of the subsequent beacon to be the transmission timing of the subsequent beacon.

13. A wireless communication method in a wireless communication apparatus which performs, with a communication terminal, predetermined data communication during an active interval, and does not perform the predetermined data communication during an inactive interval, the wireless communication method comprising:
- an interval set step of alternately setting the active interval and the inactive interval;
- a base station communication step of performing the predetermined data communication with the communication terminal as well as transmitting a beacon, after performing a first modulation on the beacon, to the communication terminal during the active interval which is set in the interval set step, the beacon including information indicating a start timing of a subsequent active interval which is set in the interval set step; and
- a sub-beacon transmission step of transmitting a sub-beacon to the communication terminal during the inactive interval, after performing a second modulation, which is a modulation method simpler than that used in the first modulation, on the sub-beacon including time information and a synchronization symbol, the time information providing notice of a transmission timing of a subsequent beacon which is to be transmitted in the base station communication step.

14. A wireless communication method in a communication terminal which performs, with a base station alternately setting an active interval and an inactive interval, predetermined data communication during the active interval, and does not perform the predetermined data communication during the inactive interval, the wireless communication method comprising:
- a terminal communication step of performing the predetermined data communication with the base station and receiving, from the base station, during the active interval, a beacon including information indicating a start timing of a subsequent active interval so as to obtain the start timing of the subsequent active interval;
- a sub-beacon reception step of receiving from the base station, when the start timing of the subsequent active interval is not obtained in the terminal communication step, a sub-beacon which provides notice of a transmission timing of a subsequent beacon so as to obtain the transmission timing at which the subsequent beacon is transmitted; and
- a power supply control step of stopping, when the start timing of the subsequent active interval is obtained in the terminal communication step, a supply of power to an unit related to a wireless communication function, after the end of the predetermined data communication until the start timing, and stopping, when the transmission timing at which the subsequent beacon is transmitted is obtained in the sub-beacon reception step, the supply of power to the unit related to the wireless communication function until the transmission timing, wherein
the sub-beacon includes time information having a plurality of digits as information providing notice of the transmission timing of the subsequent beacon, and a more significant digit of the time information is transmitted later than a less significant digit thereof, and
wherein, in the sub-beacon reception step, when the sub-beacon is received and the time information is obtained from the sub-beacon, and in the case where cancellation of significant digits occurs at the less significant digit portion of the time information but the more significant digit portion of the time information is successfully received, the less significant digit portion at which the cancellation of the significant digits occurs is replaced with a predetermined value in the sub-beacon reception step, such that an earliest timing among possible transmission timings of the subsequent beacon is set to be the transmission timing of the subsequent beacon.

15. A wireless communication method in a wireless communication system including a base station and a communication terminal, which performs, between the base station and the communication terminal, predetermined data communication during an active interval, and does not perform the predetermined data communication during an inactive interval, the wireless communication method comprising:
- an interval set step of alternately setting, by the base station, the active interval and the inactive interval;
- a base station communication step of performing, by the base station, the predetermined data communication with the communication terminal as well as transmitting a beacon, after performing a first modulation, to the communication terminal during the active interval which is set in the interval set step, the beacon including information indicating a start timing of a subsequent active interval which is set in the interval set step;
- a sub-beacon transmission step of transmitting, by the base station, a sub-beacon to the communication terminal during the inactive interval, after performing a second modulation, which is a modulation method simpler than that used in the first modulation, on the sub-beacon including time information and a synchronization symbol, the time information providing notice of a transmission timing of a subsequent beacon which is to be transmitted in the base station communication step;
- a terminal communication step of performing, by the communication terminal, the predetermined data communication with the base station and receiving, by the communication terminal, during the active interval, the beacon from the base station so as to obtain the start timing of the subsequent active interval;
- a sub-beacon reception step of receiving, by the communication terminal, the sub-beacon from the base station when the start timing of the subsequent active interval is not obtained in the terminal communication step, so as to obtain the transmission timing at which the subsequent beacon is transmitted; and
- a power supply control step of stopping by the communication terminal, when the start timing of the subsequent active interval is obtained in the terminal communication step, a supply of power to an unit related to a wireless communication function, after the end of the predetermined data communication until the start timing, and stopping by the communication terminal, when the transmission timing at which the subsequent beacon is transmitted is obtained in the sub-beacon reception step, the supply of power to the unit related to the wireless communication function until the transmission timing, wherein
the sub-beacon includes time information having a plurality of digits as information providing notice of the transmission timing of the subsequent beacon, and a more significant digit of the time information is transmitted later than a less significant digit thereof, and
wherein, in the sub-beacon reception step, when the sub-beacon is received and the time information is obtained from the sub-beacon, and in the case where cancellation of significant digits occurs at the less significant digit portion of the time information but the more significant digit portion of the time information is successfully received, the less significant digit portion at which the cancellation of the significant digits occurs is replaced with a predetermined value in the sub-beacon reception step, such that an earliest timing among possible transmission timings of the subsequent beacon is set to be the transmission timing of the subsequent beacon.

* * * * *